(12) United States Patent
She et al.

(10) Patent No.: US 11,872,999 B2
(45) Date of Patent: Jan. 16, 2024

(54) SELF-DRIVING SAFETY EVALUATION METHOD, APPARATUS, AND SYSTEM

(71) Applicant: Huawei Technologies Co., Ltd., Shenzhen (CN)

(72) Inventors: Xiaoli She, Shanghai (CN); Jianyong Cai, Shanghai (CN); Junqiang Shen, Shenzhen (CN); Qi Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 200 days.

(21) Appl. No.: 17/018,505

(22) Filed: Sep. 11, 2020

(65) Prior Publication Data

US 2020/0406911 A1    Dec. 31, 2020

Related U.S. Application Data

(63) Continuation of application No. PCT/CN2019/072074, filed on Jan. 17, 2019.

(30) Foreign Application Priority Data

Mar. 16, 2018    (CN) .................. 201810220891.X

(51) Int. Cl.
*B60W 50/04*        (2006.01)
*B60W 30/095*       (2012.01)
(Continued)

(52) U.S. Cl.
CPC .......... *B60W 50/045* (2013.01); *B60W 30/08* (2013.01); *B60W 30/095* (2013.01);
(Continued)

(58) Field of Classification Search
CPC ................... G08G 9/02; G08G 7/02
See application file for complete search history.

(56) References Cited

U.S. PATENT DOCUMENTS

2011/0118939 A1    5/2011  Kawamata et al.
2011/0190972 A1*   8/2011  Timmons .............. G01C 21/34
                                                701/31.4
(Continued)

FOREIGN PATENT DOCUMENTS

CN    102067052 A    5/2011
CN    103917432 A    7/2014
(Continued)

OTHER PUBLICATIONS

"Amendment in the Nature of a Substitute to H.R. 3388," Jul. 26, 2017, 36 pages.
(Continued)

*Primary Examiner* — Jonathan M Dager
*Assistant Examiner* — Aaron K McCullers
(74) *Attorney, Agent, or Firm* — Conley Rose, P.C.

(57) ABSTRACT

A self-driving safety evaluation method, including determining $R_B$ based on a risk value of a vehicle in a shadow driving mode in a first measurement unit, where $R_B$ is a risk value of the vehicle in the shadow driving mode in a plurality of measurement units, and determining $R_C$ based on a risk value of the vehicle in a self-driving mode based on a preset route in the first measurement unit, where $R_C$ is a risk value of the vehicle in the self-driving mode based on the preset route in the measurement units, where $R_B$ and $R_C$ are used to determine whether safety of the vehicle in the self-driving mode meets a requirement.

20 Claims, 19 Drawing Sheets

(51) Int. Cl.
  *B60W 50/08* (2020.01)
  *B60W 50/10* (2012.01)
  *B60W 30/18* (2012.01)
  *B60W 30/182* (2020.01)
  *B60W 30/08* (2012.01)

(52) U.S. Cl.
  CPC .... *B60W 30/182* (2013.01); *B60W 30/18009* (2013.01); *B60W 30/18159* (2020.02); *B60W 30/18163* (2013.01); *B60W 50/082* (2013.01); *B60W 50/10* (2013.01); *B60W 50/08* (2013.01); *B60W 2520/10* (2013.01); *B60W 2520/105* (2013.01); *B60W 2520/12* (2013.01); *B60W 2520/125* (2013.01); *B60W 2552/05* (2020.02); *B60W 2554/40* (2020.02); *B60W 2554/402* (2020.02); *B60W 2554/80* (2020.02); *B60W 2554/802* (2020.02); *B60W 2554/803* (2020.02); *B60W 2554/804* (2020.02); *B60W 2556/00* (2020.02)

(56) References Cited

U.S. PATENT DOCUMENTS

| | | | |
|---|---|---|---|
| 2013/0227648 | A1 | 8/2013 | Ricci |
| 2014/0088855 | A1 | 3/2014 | Ferguson |
| 2014/0257640 | A1 | 9/2014 | Mitsumoto et al. |
| 2015/0175168 | A1 | 6/2015 | Hoye et al. |
| 2015/0185036 | A1* | 7/2015 | Braeuchle ............... G07C 5/08 701/538 |
| 2016/0059852 | A1* | 3/2016 | Yamakado .......... B60W 30/045 701/41 |
| 2016/0137198 | A1* | 5/2016 | Hauler ................. B60W 10/18 701/48 |
| 2016/0347181 | A1* | 12/2016 | Yamakado .......... B60L 15/2009 |
| 2017/0039865 | A1 | 2/2017 | Takabayashi et al. |
| 2017/0108865 | A1 | 4/2017 | Rohde et al. |
| 2017/0309092 | A1* | 10/2017 | Rosenbaum .......... G07C 5/008 |
| 2017/0316127 | A1 | 11/2017 | Han et al. |
| 2017/0341652 | A1 | 11/2017 | Sugawara et al. |
| 2017/0364080 | A1 | 12/2017 | Chintakindi |
| 2018/0012085 | A1* | 1/2018 | Blayvas ............... H04N 13/128 |
| 2018/0050702 | A1 | 2/2018 | Tanimichi et al. |
| 2018/0075309 | A1* | 3/2018 | Sathyanarayana ..... G06V 40/20 |
| 2018/0170374 | A1 | 6/2018 | Otsuka et al. |

FOREIGN PATENT DOCUMENTS

| | | | |
|---|---|---|---|
| CN | 104002808 | A | 8/2014 |
| CN | 104670222 | A | 6/2015 |
| CN | 105573323 | A | 5/2016 |
| CN | 105956268 | A | 9/2016 |
| CN | 106164998 | A | 11/2016 |
| CN | 106218639 | A | 12/2016 |
| CN | 106347359 | A | 1/2017 |
| CN | 106796759 | A | 5/2017 |
| DE | 102009052590 | A1 | 5/2011 |
| JP | 2009274594 | A | 11/2009 |
| JP | 2011134103 | A | 7/2011 |
| JP | 2012160128 | A | 8/2012 |
| JP | 2016126360 | A | 7/2016 |
| JP | 2017047694 | A | 3/2017 |
| JP | 6203381 | B2 | 9/2017 |
| KR | 20150060953 | A | 6/2015 |
| KR | 20170053799 | A | 5/2017 |
| WO | 2016158197 | A1 | 10/2016 |

OTHER PUBLICATIONS

Steininger, U., et al, "Requirements on tools for assessment and validation of assisted and automated driving systems," Nov. 25-26, 2015, Munchen, 30 pages.

Wachenfeld, W., et al, "Safety Assurance Based on an Objective Identification of Scenarios—One Approach of the Pegasus—Project," Oct. 31, 2016, Objective Identification of Scenarios, 21 pages.

Winner, H., et al, "Safety Assurance for Highly Automated Driving—The Pegasus Approach," Automated Vehicle Symposium San Francisco, Jul. 20, 2016, 22 pages.

Hungar, H., et al., "Test Specifications for Highly Automated Driving Functions: Highway Pilot," Jun. 21, 2017, 29 pages.

Bock, J., et al., "Database of relevant traffic scenarios for highly automated vehicles," Jun. 21, 2017, 14 pages.

Putz, A., "Database Approach for the Sign-Off Process of Highly Automated Vehicles," 2017, 8 pages.

Zlocki, A., "System validation of highly automated vehicles with a database of relevant traffic scenarios,"12th ITS European Congress, Strasbourg, France, Jun. 19-22, 2017, 8 pages.

Lemmer, K., "Pegasus Effectively ensuring automated driving," Apr. 6, 2017, 23 pages.

Pegasus et al, "Research project Pegasus Effectively Ensuring Automated Driving," Jan. 1, 2016-Jun. 30, 2019, 12 pages.

Zlocki, A., et al, "Securing Automated Driving–The Database Approach in Pegasus," Apr. 4, 2017, 10 pages.

Winner, H., et al, "Safety Assurance for Highly Automated Driving—The Pegasus Approach," Jan. 8, 2017, 29 pages.

Hansen Report on Automotive Electronics, "Standardization Efforts on Autonomous Driving Safety Barely Under Way," Feb. 2017, 4 pages.

Steininger, U., et al, "Validation of Assisted and Automated Driving Systems," Apr. 19-20, 2016, 26 pages.

\* cited by examiner

600

| Obtain $r_b$ and $r_c$, where $r_b$ is a risk value of a vehicle in a shadow driving mode in a first measurement unit, $r_c$ is a risk value of the vehicle in a self-driving mode based on a preset route in the first measurement unit, the shadow driving mode is a self-driving mode of the vehicle based on a real-time route, the real-time route is a route predicted based on a location and a movement parameter of the vehicle in a manual driving mode, and the first measurement unit is a time period or a distance | — S610 |

| Determine $R_B$ based on $r_b$, where $R_B$ is a risk value of the vehicle in a shadow driving mode in a plurality of measurement units, and the plurality of measurement units include the first measurement unit | — S620 |

| Determine $R_C$ based on $r_c$, where $R_C$ is a risk value of the vehicle in the self-driving mode based on the preset route in the plurality of measurement units, where $R_B$ and $R_C$ are used to determine whether safety of the vehicle in the self-driving mode meets a requirement | — S630 |

FIG. 6

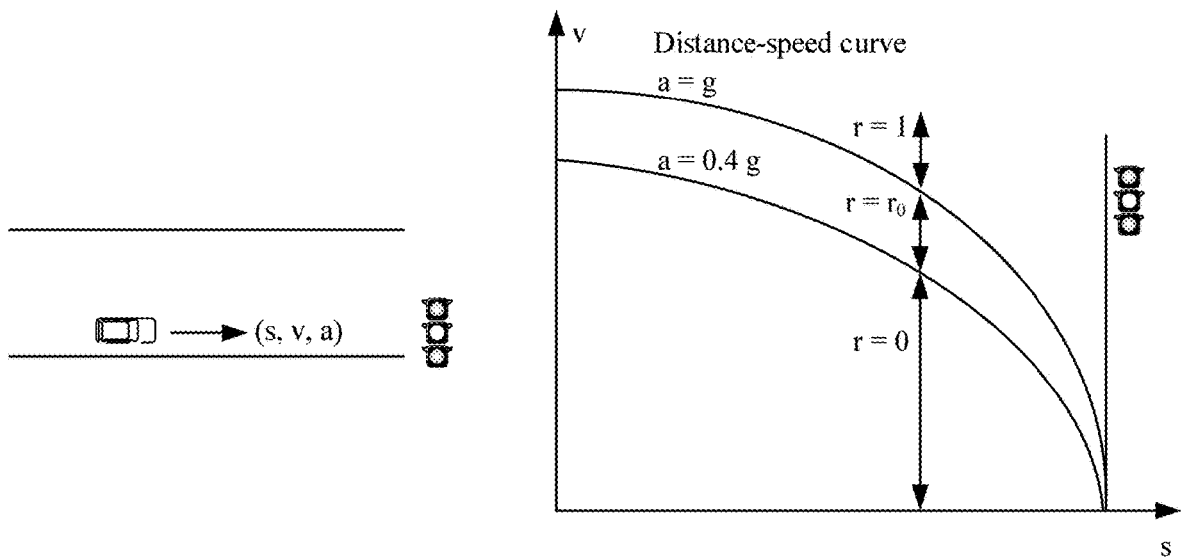

| Determine a driving mode and a risk scenario of a vehicle in a time period, where a start point of the time period is a first moment, an end point of the time period is a second moment, and the driving mode includes a self-driving mode and/or a manual driving mode | —— S910 |

| Determine, at a current moment, a risk value in the driving mode in the time period based on a risk identification manner corresponding to the risk scenario, where the current moment is after the first moment, and the current moment is before the second moment | —— S920 |

FIG. 9 ns, and system.

SELF-DRIVING SAFETY EVALUATION METHOD, APPARATUS, AND SYSTEM

CROSS-REFERENCE TO RELATED APPLICATIONS

This application is a continuation of International Patent Application No. PCT/CN2019/072074 filed on Jan. 17, 2019, which claims priority to Chinese Patent Application No. 201810220891.X filed on Mar. 16, 2018. The disclosures of the aforementioned applications are hereby incorporated by reference in their entireties.

TECHNICAL FIELD

This application relates to the field of self-driving, and in particular, to a self-driving safety evaluation method, apparatus, and system.

BACKGROUND

A self-driving automobile is also referred to as an unmanned driving automobile, and can obtain environment information using a sensor such as a radar, and control travelling of the vehicle based on the environment information, thereby reducing a time of vehicle control performed by a driver. The self-driving automobile has an advantage such as reducing traffic violation. However, a time of vehicle control performed by a driver in a self-driving mode is less than a time of vehicle control performed by the driver in a conventional manual driving mode. Therefore, there are still many uncertainties for the self-driving automobile. To reduce a risk of using a self-driving automobile by a passenger, safety of the self-driving automobile needs to be strictly evaluated before the self-driving automobile is sold.

To evaluate safety of the self-driving automobile, a large amount of travelling data of the self-driving automobile needs to be collected, for example, data generated by the self-driving automobile travelling 5 million to 6 million kilometers (km). This causes very high costs for automobile manufacturers.

An existing self-driving safety evaluation method is to enter a manual driving route into a simulated self-driving system, separately calculate safety-related factors in the manual driving mode and the self-driving mode, and obtain quantified values in the manual driving mode and the self-driving mode. According to the foregoing method, safety of the self-driving mode can be evaluated using data in the manual driving mode, thereby reducing a cost cycle for mass production of the self-driving automobile. However, a real scenario in which vehicle control is performed by a driver cannot be restored by performing safety evaluation based on the simulated self-driving system. Consequently, there is a relatively large deviation between a safety evaluation result obtained based on the simulated self-driving system and real self-driving safety.

SUMMARY

This application provides a self-driving safety evaluation method and apparatus, to reduce a deviation between a safety evaluation result and real self-driving safety.

According to a first aspect, a self-driving safety evaluation method is provided. The method includes obtaining $r_b$ and $r_c$, where $r_b$ is a risk value of a vehicle in a shadow driving mode in a first measurement unit, $r_c$ is a risk value of the vehicle in a self-driving mode based on a preset route in the first measurement unit, the shadow driving mode is a self-driving mode of the vehicle that is based on a real-time route, the real-time route is a route predicted based on a location and a movement parameter of the vehicle in a manual driving mode, and the first measurement unit is a time period or a distance, determining $R_B$ based on $r_b$, where $R_B$ is a risk value of the vehicle in the shadow driving mode in a plurality of measurement units, and the plurality of measurement units include the first measurement unit, and determining $R_C$ based on $r_c$, where $R_C$ is a risk value of the vehicle in the self-driving mode based on the preset route in the plurality of measurement units, where $R_B$ and $R_C$ are used to determine whether safety of the vehicle in the self-driving mode meets a requirement.

$r_b$ and $r_c$ reflect a probability that a risk develops into an accident. In the self-driving safety evaluation method provided in this application, in addition to collection of risk data generated in the self-driving mode based on the preset route, risk data generated in the self-driving mode based on the real-time route is further collected. The real-time route is the route predicted based on the location and the movement parameter of the vehicle in the manual driving mode. For example, when the driver controls the vehicle and changes the preset route, the in-vehicle safety evaluation apparatus can re-plan the self-driving route based on the route of vehicle control performed by the driver, and determine safety of self-driving based on the re-planned self-driving route, thereby more truly evaluating the safety of self-driving.

In an optional implementation, the method further includes calculating a sum of $R_B$ and $R_C$, and when the sum of $R_B$ and $R_C$ is less than or equal to a self-driving risk threshold, determining that safety of the vehicle in the self-driving mode meets a requirement.

The foregoing embodiment may be implemented by an apparatus for determining $R_B$ and $R_C$, without a need of sending $R_B$ and $R_C$ to another device and evaluating, by the other device, safety of the vehicle in the self-driving mode, thereby improving real-time performance of safety evaluation of the self-driving mode.

In an optional implementation, the self-driving risk threshold is $a(R_A+R'_A)$, where a is a risk tolerance coefficient, $R_A$ is a risk value of the vehicle in the manual driving mode in the plurality of measurement units, a road section through which the vehicle passes in the plurality of measurement units is a first road section, and $R'_A$ is a risk value of the vehicle passing through the first road section outside the plurality of measurement units based on the manual driving mode.

A risk value of self-driving may be compared with a risk value of manual driving, and a tolerance coefficient that the risk value of the self-driving can be accepted may be set, to determine whether safety of the self-driving satisfies a requirement.

In an optional implementation, determining $R_B$ based on $r_b$ and the determining $R_C$ based on $r_c$ includes determining $R_B$ or $R_C$ based on $R_i=(\Sigma_{event}s_{event} \times r_i)/X$, where event represents a risk scenario, $s_{event}$ represents a coefficient of a severity degree of an accident in the risk scenario, X represents the plurality of measurement units, when $r_i$ represents $r_b$, $R_i$ represents $R_B$, and when $r_i$ represents $r_c$, $R_i$ represents $R_C$.

$s_{event}$ reflects severity degrees of accidents in different risk scenarios. For example, in a collision scenario, a severity degree of colliding with a person is far higher than a severity degree of colliding with another object. Therefore, the severity degree of colliding with the person may be set to 1, and the severity degree of colliding with the other object may be selected, for example, from 0.1 to 0.9 based on a property of the object. $r_i$ reflects a probability that a risk develops into an accident, Σ reflects an accumulation of risks in the plurality of measurement units, and R$_i$ reflects an average probability that risks develop into accidents in the measurement units. The foregoing formula can objectively reflect a self-driving risk.

In an optional implementation, obtaining $r_b$ and $r_c$ includes when the risk scenario is the collision scenario, determining $r_b$ and $r_c$ based on at least one of the following parameters: a speed $\Delta_v$ of the vehicle relative to a collision object, a time-to-collision (TTC) between the vehicle and the collision object that is estimated based on a movement track of the collision object, a time-to-headway (THW) of the vehicle that is estimated based on a distance between the vehicle and the collision object, and the distance between the vehicle and the collision object, where Δv is positively correlated to $r_b$ or $r_c$, the TTC is negatively correlated to $r_b$ or $r_c$, the THW is negatively correlated to $r_b$ or $r_c$, and the distance between the vehicle and the collision object is negatively correlated to $r_b$ or $r_c$.

In the collision scenario, a higher relative movement speed indicates a higher probability that a risk develops into an accident, that is, Δv is positively correlated to $r_b$ or $r_c$, a longer TTC indicates a higher possibility of adjusting a travelling route by the vehicle to avoid a collision and a lower probability of occurrence of a collision, and therefore TTC is negatively correlated to $r_b$ or $r_c$, a longer available THW indicates a smaller probability of occurrence of a collision, and therefore THW is negatively correlated to $r_b$ or $r_c$, and a longer distance between the vehicle and the collision object indicates a higher possibility of adjusting the travelling route by the vehicle to avoid a collision and a lower probability of occurrence of a collision, and therefore the distance between the vehicle and the collision object is negatively correlated to $r_b$ or $r_c$.

In an optional implementation, the determining $r_b$ and $r_c$ based on at least one of the following parameters a speed Δv of the vehicle relative to a collision object, a TTC between the vehicle and the collision object that is estimated based on a movement track of the collision object, a THW of the vehicle that is estimated based on a distance between the vehicle and the collision object, and the distance between the vehicle and the collision object includes determining $r_b$ and $r_c$ based on $r_{SG1}=f(t)_{max}$, where $r_{SG1}$ is $r_b$ or $r_c$ in the collision scenario, $t\in\{t_{event}, h(t_{event},obj)=1\}$, $f(t)=\Delta v(t)*\exp(-\min\{r_0 TTC(t), r_1 THW(t), r_2 s\})$ $\{t_{event}, h(t_{event},obj)=1\}$ represents a time period in which a collision risk occurs, TTC(t) represents a TTC at a t moment, THW(t) represents a THW at the t moment, TTC=

$$TTC = \frac{-v-\sqrt{v^2-2ax}}{a}, THW = \frac{v^2}{2a_m x},$$

$r_0$, $r_1$, and $r_2$ are each a normalized parameter, v is a speed of the vehicle at the t moment, Δv(t) is Δv at the t moment, exp is an exponent whose base is a natural constant, and s represents the distance between the vehicle and the collision object.

In an optional implementation, obtaining $r_b$ and $r_c$ includes when the risk scenario is a traffic signal light scenario, determining $r_b$ and $r_c$ based on a speed of the vehicle and a distance from the vehicle to a traffic signal light, where the speed of the vehicle is positively correlated to $r_b$ or $r_c$, and the distance from the vehicle to the traffic signal light is negatively correlated to $r_b$ or $r_c$.

In the traffic signal light scenario, a higher speed of the vehicle indicates a higher probability of violating a traffic signal light rule (for example, running a red light), and therefore the speed of the vehicle is positively correlated to $r_b$ or $r_c$, and a longer distance from the vehicle to the traffic signal light indicates a longer time for the vehicle to change a travelling status and a lower probability of running the traffic signal light, and therefore the distance from the vehicle to the traffic signal light is negatively correlated to $r_b$ or $r_c$.

In an optional implementation, determining $r_b$ and $r_c$ based on a speed of the vehicle and a distance from the vehicle to a traffic signal light includes determining $r_b$ and $r_c$ based on $r_{SG2}=f(t)_{max}$, where $r_{SG2}$ is $r_b$ or $r_c$ in the traffic signal light scenario $t\in\{t_{event}, h(t_{event},Light)=1\}$, $$f(t) = \begin{cases} 1, & \text{when } v(t)^2 \leq 2gs(t) \\ \frac{r_3 v(t)^2}{gs(t)}, & \text{when } 0.8gs(t) \leq v(t)^2 \leq 2gs(t) \\ 0, & \text{when } v(t)^2 \geq 0.8gs(t) \end{cases}$$

$r_3$ is a normalized parameter, $\{t_{event}, h(t_{event},Light)=1\}$ represents a time period in which a risk of violating a traffic signal light rule occurs, v(t) represents a speed of the vehicle at a t moment, g is a gravitational acceleration constant, and s(t) represents a distance from the vehicle to the traffic signal light at the t moment.

In an optional implementation, obtaining $r_b$ and $r_c$ includes when the risk scenario is a scenario in which the vehicle rushes out of a road boundary, determining $r_b$ and $r_c$ based on an estimated time taken by the vehicle to rush out of a lane, where the estimated time taken by the vehicle to rush out of the lane is negatively correlated to $r_b$ or $r_c$.

In the scenario in which the vehicle rushes out of a road boundary, a longer estimated time taken by the vehicle to rush out of the lane indicates a longer time for the vehicle to adjust the travelling status and a lower probability of rushing out of the road by the vehicle. Therefore, the estimated time taken by the vehicle to rush out of the lane is negatively correlated to $r_b$ or $r_c$.

In an optional implementation, determining $r_b$ and $r_c$ based on an estimated time taken by the vehicle to rush out of a lane includes determining $r_b$ and $r_c$ based on $$r_{SG3} = \begin{cases} e^{-r_4 t_{lc}}, & \text{when } t_{lc} < TLC_{threshold} \\ 0, & \text{when } t_{lc} \geq TLC_{threshold} \end{cases},$$

where $r_{SG3}$ is $r_b$ or $r_c$ in the scenario in which the vehicle rushes out of a road boundary, $TLC_{threshold}$ represents a critical value of a time required by the vehicle to rush out of a road, $$t_{lc} = \frac{\left(y \pm \frac{W_{road}}{2}\right)}{(v_{long}(\phi - \phi_d) + v_{lat})},$$

e is a natural constant, $t_{lc}$ is an estimated time taken by the vehicle to rush out of the lane, y is a lateral offset of the vehicle at the road boundary, $W_{road}$ is a width of the road, $v_{long}$ is a longitudinal speed of the vehicle, $v_{lat}$ is a lateral speed of the vehicle, $\phi$-$\phi_d$ represents an angle between a heading direction of the vehicle and a road tangent direction, and $r_4$ is a normalized parameter.

In an optional implementation, obtaining $r_b$ and $r_c$ includes when the risk scenario is a non-conventional travelling scenario, determining $r_b$ and $r_c$ based on at least one of the following parameters a longitudinal acceleration of the vehicle, a lateral acceleration of the vehicle, and a speed of the vehicle, where the longitudinal acceleration of the vehicle is positively correlated to $r_b$ or $r_c$, the lateral acceleration of the vehicle is positively correlated to $r_b$ or $r_c$, and the speed of the vehicle is positively correlated to $r_b$ or $r_c$.

The non-conventional travelling scenario may be, for example, a travelling scenario in which the vehicle has a lateral acceleration. A larger longitudinal acceleration indicates a higher probability of overspeed of the vehicle or an abrupt brake of the vehicle. Therefore, the longitudinal acceleration of the vehicle is positively correlated to $r_b$ or $r_c$. A larger lateral acceleration indicates a higher probability of abrupt turning of the vehicle. Therefore, the lateral acceleration of the vehicle is positively correlated to $r_b$ or $r_c$. A higher speed of the vehicle indicates a higher probability of occurrence of non-conventional travelling such as overspeed. Therefore, the speed of the vehicle is positively correlated to $r_b$ or $r_c$.

In an optional implementation, determining $r_b$ and $r_c$ based on at least one of the following parameters a longitudinal acceleration of the vehicle, a lateral acceleration of the vehicle, and a speed of the vehicle includes determining $r_b$ and $r_c$ based on $r_{SG4}=r_5$, where $r_{SG4}$ is $r_b$ or $r_c$ in a non-conventional travelling scenario, $(|a_{long}|>a_{threshold1})\|(|a_{lat}|>a_{threshold2})\|(v\geq v_{safe})$, along represents the longitudinal acceleration of the vehicle, $a_{lat}$ represents the lateral acceleration of the vehicle, $a_{threshold1}$ represents a threshold of the lateral acceleration in a safe travelling status, $a_{threshold2}$ represents a threshold of the longitudinal acceleration in the safe travelling status, v represents the speed of the vehicle, $v_{safe}$ represents a speed threshold in the safe travelling status, and $r_5$ is a normalized parameter.

In an optional implementation, obtaining $r_b$ and $r_c$ includes determining a driving mode and a risk scenario of the vehicle in a time period, where a start point of the time period is a first moment, an end point of the time period is a second moment, and the driving mode includes a self-driving mode and/or a manual driving mode, and determining a risk value in the driving mode in the time period based on a risk identification manner corresponding to the risk scenario at a current moment, where the current moment is after the first moment, and the current moment is before the second moment.

The time period may be a measurement unit, and the risk value in the driving mode in the time period is, for example, $r_b$ or $r_c$. The vehicle selects a time period from a plurality of time periods required for travelling a distance, and determines, at a moment (that is, the current moment) in the time period, a risk value in a corresponding driving mode in the time period using known travelling information and predicted travelling information. For example, the determined time period is one second, and the current moment is a moment of 0.4 seconds (s). If an overspeed travelling status occurs in the past 0.4 s, the vehicle may determine that a risk value of non-conventional driving in the driving mode in the time period is 1, to be specific, a probability of occurrence of overspeed is 100%. If no overspeed travelling status occurs in the past 0.4 s, and the vehicle determines, based on a current speed and acceleration of the vehicle, that a vehicle speed in future 0.6 s is to remain in a legal travelling speed, the vehicle may determine that a risk value of non-conventional driving in the time period is a value less than 1, to be specific, a probability of occurrence of overspeed is less than 100%. In this embodiment, a time period required for travelling a distance is divided into the plurality of time periods, and a risk value in a driving mode in each time period is determined based on a traffic context in the time period such that a risk can be more objectively identified.

In an optional implementation, before determining, at a current moment, a risk value in the driving mode in the time period based on a risk identification manner corresponding to the risk scenario, the method further includes determining a location and a movement parameter of the vehicle at the first moment, where the vehicle travels at the first moment based on the manual driving mode, predicting a location of the vehicle at a third moment based on the location and the movement parameter of the vehicle at the first moment, where the third moment is later than the first moment, and predicting a shadow driving mode of the vehicle from the location at the first moment to the location at the third moment based on the location at the first moment and the location at the third moment, where the shadow driving mode is a self-driving mode of the vehicle that is predicted based on the location and the movement parameter of the vehicle in the manual driving mode. The determining, at a current moment, a risk value in the driving mode in the time period based on a risk identification manner corresponding to the risk scenario includes determining, at the current moment, $r_a$, $r_b$, and $r_c$ based on the risk identification manner corresponding to the risk scenario, where $r_a$ is a risk value in the manual driving mode in the time period, $r_b$ is a risk value in the shadow driving mode in the time period, and $r_c$ is a risk value in the self-driving mode based on the preset route in the time period.

The vehicle may predict a location of the vehicle after a future time period based on the location and the movement parameter of the vehicle at the first moment, that is, predict a location of the vehicle at the third moment. The vehicle is in a manual driving status at the first moment, and subsequently, the vehicle predicts the shadow driving mode of the vehicle from the location at the first moment to the location at the third moment. In the foregoing embodiment, a route of self-driving is continuously modified based on the location and the movement parameter in the manual driving mode, to enable a route in the self-driving mode to be closer to a route in the manual driving mode. Therefore, more objective self-driving risk data can be obtained.

According to a second aspect, this application further provides a method for determining a driving risk of a vehicle. The method is applied to a vehicle that has a self-driving mode and a manual driving mode. The method includes determining a driving mode and a risk scenario of the vehicle in a time period, where a start point of the time period is a first moment, an end point of the time period is a second moment, and the driving mode includes the self-driving mode and/or the manual driving mode, and determining, at a current moment, a risk value in the driving mode in the time period based on a risk identification manner corresponding to the risk scenario, where the current moment is after the first moment, and the current moment is before the second moment.

The vehicle selects a time period from a plurality of time periods required for travelling a distance, and determines a risk value in a corresponding driving mode in the time period using known travelling information and predicted travelling information at a moment (that is, the current moment) in the time period. For example, the determined time period is one second, and the current moment is a moment of 0.4 s. If an overspeed travelling status occurs in the past 0.4 s, the vehicle may determine that the risk value of non-conventional driving in the driving mode in the time period is 1, to be specific, a probability of occurrence of overspeed is 100%. If no overspeed travelling status occurs in the past 0.4 s, and the vehicle determines, based on a current speed and acceleration of the vehicle, that a vehicle speed in future 0.6 s is to remain in a legal travelling speed, the vehicle may determine that a risk value of non-conventional driving in the time period is a value less than 1, to be specific, a probability of occurrence of overspeed is less than 100%. In this embodiment, a time period required for travelling a distance is divided into the plurality of time periods, and a risk value in a driving mode in each time period is determined based on a traffic context in the time period such that a risk can be more objectively identified.

In an optional implementation, before determining, at a current moment, a risk value in the driving mode in the time period based on a risk identification manner corresponding to the risk scenario, the method further includes determining a location and a movement parameter of the vehicle at the first moment, where the vehicle travels at the first moment based on the manual driving mode, predicting a location of the vehicle at a third moment based on the location and the movement parameter of the vehicle at the first moment, where the third moment is later than the first moment, and predicting a shadow driving mode of the vehicle from the location at the first moment to the location at the third moment based on the location at the first moment and the location at the third moment, where the shadow driving mode is a self-driving mode of the vehicle that is predicted based on the location and the movement parameter of the vehicle in the manual driving mode. The determining, at a current moment, a risk value in the driving mode in the time period based on a risk identification manner corresponding to the risk scenario includes determining, at the current moment, $r_a$, $r_b$, and $r_c$ based on the risk identification manner corresponding to the risk scenario, where $r_a$ is a risk value in the manual driving mode in the time period, $r_b$ is a risk value in the shadow driving mode in the time period, and $r_c$ is a risk value in a self-driving mode based on a preset route in the time period.

The vehicle may predict a location of the vehicle after a future time period based on the location and the movement parameter of the vehicle at the first moment, that is, predict a location of the vehicle at the third moment. The vehicle is in a manual driving status at the first moment, and subsequently, the vehicle predicts the shadow driving mode of the vehicle from the location at the first moment to the location at the third moment. In the foregoing embodiment, a route of self-driving is continuously modified based on the location and the movement parameter in the manual driving mode, to enable a route in the self-driving mode to be closer to a route in the manual driving mode. Therefore, more objective self-driving risk data can be obtained.

In an optional implementation, determining, at the current moment, $r_a$, $r_b$, and $r_c$ based on the risk identification manner corresponding to the risk scenario includes when the risk scenario is a collision scenario, determining $r_a$, $r_b$, and $r_c$ based on at least one of the following parameters: a speed $\Delta v$ of the vehicle relative to a collision object, a TTC between the vehicle and the collision object that is estimated based on a movement track of the collision object, a THW of the vehicle that is estimated based on a distance between the vehicle and the collision object, and the distance between the vehicle and the collision object, where $\Delta v$ is positively correlated to $r_a$, $r_b$, or $r_c$, the TTC is negatively correlated to $r_a$, $r_b$, or $r_c$, the THW is negatively correlated to $r_a$, $r_b$, or $r_c$, and the distance between the vehicle and the collision object is negatively correlated to $r_a$, $r_b$, or $r_c$.

In the collision scenario, a higher relative movement speed indicates a higher probability that a risk develops into an accident, that is, $\Delta v$ is positively correlated to $r_a$, $r_b$, or $r_c$, a longer TTC indicates a higher possibility of adjusting a travelling route by the vehicle to avoid a collision and a lower probability of occurrence of a collision, and therefore TTC is negatively correlated to $r_a$, $r_b$, or $r_c$, a longer available THW indicates a smaller probability of occurrence of a collision, and therefore THW is negatively correlated to $r_a$, $r_b$, or $r_c$, and a longer distance between the vehicle and the collision object indicates a higher possibility of adjusting the travelling route by the vehicle to avoid a collision and a lower probability of occurrence of a collision, and therefore the distance between the vehicle and the collision object is negatively correlated to $r_a$, $r_b$, or $r_c$.

In an optional implementation, determining $r_a$, $r_b$, and $r_c$ based on at least one of the following parameters: a speed $\Delta v$ of the vehicle relative to a collision object, a TTC between the vehicle and the collision object that is estimated based on a movement track of the collision object, a THW of the vehicle that is estimated based on a distance between the vehicle and the collision object, and the distance between the vehicle and the collision object includes determining $r_a$, $r_b$, and $r_c$ based on $r_{SG1} = f(t)_{max}$, where $r_{SG1}$ is $r_a$, $r_b$, or $r_c$ in the collision scenario, $t \in \{t_{event}, h(t_{event}, obj)=1\}$, $f(t) = \Delta v(t) * \exp(-\min\{r_0 TTC(t), r_1 THW(t), r_2 s\})$, $\{t_{event}, h(t_{event}, obj)=1\}$ represents a time period in which a collision risk occurs, TTC(t) represents a TTC at a t moment, THW(t) represents a THW at the t moment $$TTC = \frac{-v - \sqrt{v^2 - 2ax}}{a},$$

$$THW = \frac{v^2}{2a_m x},$$

$r_0$, $r_1$, and $r_2$ are each a normalized parameter, v is a speed of the vehicle at the t moment, $\Delta v(t)$ is $\Delta v$ at the t moment, exp is an exponent whose base is a natural constant, and s represents the distance between a vehicle and a collision object.

In an optional implementation, determining, at the current moment, $r_a$, $r_b$, and $r_c$ based on the risk identification manner corresponding to the risk scenario includes when the risk scenario is a traffic signal light scenario, determining $r_a$, $r_b$, and $r_c$ based on a speed of the vehicle and a distance from the vehicle to a traffic signal light, where the speed of the vehicle is positively correlated to $r_a$, $r_b$, or $r_c$, and the distance from the vehicle to the traffic signal light is negatively correlated to $r_a$, $r_b$ or $r_c$.

In the traffic signal light scenario, a higher speed of the vehicle indicates a higher probability of violating a traffic signal light rule (for example, running a red light), and therefore the speed of the vehicle is positively correlated to $r_a$, $r_b$, or $r_c$, and a longer distance from the vehicle to the traffic signal light indicates a longer time for the vehicle to change a travelling status and a lower probability of running the traffic signal light, and therefore the distance from the vehicle to the traffic signal light is negatively correlated to $r_a$, $r_b$, or $r_c$.

In an optional implementation, determining $r_a$, $r_b$, and $r_c$ based on a speed of the vehicle and a distance from the vehicle to a traffic signal light includes determining $r_a$, $r_b$, and $r_c$ based on $r_{SG2}=f(t)_{max}$, where $r_{SG2}$ is $r_a$, $r_b$, or $r_c$ in the traffic signal light scenario, $t \in \{t_{event}, h(t_{event}, \text{Light})=1\}$, $$f(t) = \begin{cases} 1, & \text{when } v(t)^2 \geq 2 \text{ g } s(t) \\ \dfrac{r_3 v(t)^2}{g\, s(t)}, & \text{when } 0.8 \text{ g } s(t) \leq v(t)^2 \leq 2 \text{ g } s(t), \\ 0, & \text{when } v(t)^2 \leq 0.8 \text{ g } s(t) \end{cases}$$

$r_3$ is a normalized parameter, $\{t_{event}, h(t_{event}, \text{Light})=1\}$ represents a time period in which a risk of violating a traffic signal light rule occurs, $v(t)$ represents a speed of the vehicle at a t moment, g is a gravitational acceleration constant, and $s(t)$ represents a distance from the vehicle to the traffic signal light at the t moment.

In an optional implementation, determining, at the current moment, $r_a$, $r_b$, and $r_c$ based on the risk identification manner corresponding to the risk scenario includes when the risk scenario is a scenario in which the vehicle rushes out of a road boundary, determining $r_a$, $r_b$, and $r_c$ based on an estimated time taken by the vehicle to rush out of a lane, where the estimated time taken by the vehicle to rush out of the lane is negatively correlated to $r_a$, $r_b$, or $r_c$.

In the scenario in which the vehicle rushes out of a road boundary, a longer estimated time taken by the vehicle to rush out of the lane indicates a longer time for the vehicle to adjust the travelling status, and a lower probability of rushing out of the road by the vehicle. Therefore, the estimated time taken by the vehicle to rush out of the lane is negatively correlated to $r_b$ or $r_c$.

In an optional implementation, determining $r_a$, $r_b$, and $r_c$ based on an estimated time taken by the vehicle to rush out of a lane includes determining $r_a$, $r_b$, and $r_c$ based on $$r_{SG3} = \begin{cases} e^{-r_4 t_{lc}}, & \text{when } t_{lc} < TLC_{threshold} \\ 0, & \text{when } t_{lc} \geq TLC_{threshold} \end{cases},$$

where $r_{SG3}$ is $r_a$, $r_b$, or $r_c$ in the scenario in which the vehicle rushes out of a road boundary, $TLC_{threshold}$ represents a critical value of a time required by the vehicle to rush out of a road, $$t_{lc} = \frac{\left(y \pm \dfrac{W_{road}}{2}\right)}{(v_{long}(\phi - \phi_d) + v_{lat})},$$

e is a natural constant, $t_{lc}$ is an estimated time taken by the vehicle to rush out of the lane, y is a lateral offset of the vehicle at the road boundary, $W_{road}$ is a width of the road, $v_{long}$ is a longitudinal speed of the vehicle, $v_{lat}$ is a lateral speed of the vehicle, $\phi-\phi_d$ represents an angle between a heading direction of the vehicle and a road tangent direction, and $r_4$ is a normalized parameter.

In an optional implementation, obtaining, at the current moment, $r_a$, $r_b$, and $r_c$ based on the risk identification manner corresponding to the risk scenario includes when the risk scenario is a non-conventional travelling scenario, determining $r_a$, $r_b$, and $r_c$ based on at least one of the following parameters a longitudinal acceleration of the vehicle, a lateral acceleration of the vehicle, and a speed of the vehicle, where the longitudinal acceleration of the vehicle is positively correlated to $r_a$, $r_b$, or $r_c$, the lateral acceleration of the vehicle is positively correlated to $r_a$, $r_b$, or $r_c$, and the speed of the vehicle is positively correlated to $r_a$, $r_b$, or $r_c$.

A larger longitudinal acceleration indicates a higher probability of overspeed of the vehicle or an abrupt brake of the vehicle. Therefore, the longitudinal acceleration of the vehicle is positively correlated to $r_a$, $r_b$, or $r_c$. A larger lateral acceleration indicates a higher probability of abrupt turning of the vehicle. Therefore, the lateral acceleration of the vehicle is positively correlated to $r_a$, $r_b$, or $r_c$. A higher speed of the vehicle indicates a higher probability of occurrence of non-conventional travelling such as overspeed. Therefore, the speed of the vehicle is positively correlated to $r_a$, $r_b$, or $r_c$.

In an optional implementation, determining $r_a$, $r_b$, and $r_c$ based on at least one of the following parameters: a longitudinal acceleration of the vehicle, a lateral acceleration of the vehicle, and a speed of the vehicle includes determining $r_a$, $r_b$, and $r_c$ based on $r_{SG4}=r_5$, where $r_{SG4}$ is $r_a$, $r_b$, or $r_c$ in a non-conventional travelling scenario, $(|a_{long}|>a_{threshold1})||(|a_{lat}|>a_{threshold2})||(v \geq v_{safe})$, $a_{long}$ represents the longitudinal acceleration of the vehicle, $a_{lat}$ represents the lateral acceleration of the vehicle, $a_{threshold1}$ represents a threshold of the lateral acceleration in a safe travelling status, $a_{threshold2}$ represents a threshold of the longitudinal acceleration in the safe travelling status, v represents the speed of the vehicle, $v_{safe}$ represents a speed threshold in the safe travelling status, and $r_5$ is a normalized parameter.

In an optional implementation, the method further includes sending $r_a$, $r_b$, and $r_c$ to a safety center, and $r_a$, $r_b$ and $r_c$ are used to evaluate safety in the manual driving mode and the shadow driving mode.

After obtaining $r_a$, $r_b$, or $r_c$, the vehicle may send the risk data or original data (for example, a speed value of the vehicle that is measured by a sensor) corresponding to the risk data to the safety center such that the safety center evaluates safety in the manual driving mode and the shadow driving mode, thereby reducing an operating load of an in-vehicle processor.

In an optional implementation, the method further includes receiving safety scenario information sent by the safety center, where the safety scenario information is used to indicate a safe driving traffic scenario set in the self-driving mode, determining the safe driving traffic scenario set in the self-driving mode based on the safety scenario information, and if a current traffic scenario does not belong to the safe driving traffic scenario set, playing and/or displaying, by the vehicle, prompt information prompting a driver to perform manual driving, and/or performing, by the vehicle, safe stopping processing.

The safety center may identify a risk scenario based on risk data reported by the vehicle, and update a risk identification mechanism and a risk control policy of the vehicle by sending the safety scenario information to the vehicle. For example, if a risk is caused by a potential risk of a self-driving system, the safety scenario information may instruct the vehicle to exclude the risk scenario from the safe driving traffic scenario set. The vehicle updates the safe driving traffic scenario set after receiving the safety scenario information. If the current traffic scenario does not belong to the updated safe driving traffic scenario set, the vehicle takes safety measures, for example, plays and/or displays prompt information prompting the driver to perform manual driving, and/or performs safe stopping processing.

According to a third aspect, a self-driving safety evaluation apparatus is provided. The apparatus can implement functions in the method in the first aspect. The functions may be implemented by hardware, or may be implemented by executing corresponding software by hardware. The hardware or software includes units or modules that correspond to one or more of the functions.

In a possible design, the apparatus includes a processor and a transceiver. The processor is configured to support the apparatus in performing the functions in the method in the first aspect. The transceiver is configured to support communication between the apparatus and another apparatus. The apparatus may further include a memory. The memory is configured to couple to the processor, and the memory stores a program instruction and data that are necessary for the apparatus.

According to a fourth aspect, a computer readable storage medium is provided. The computer readable storage medium stores computer program code. When the computer program code is executed by a processing unit or a processor, a self-driving safety evaluation apparatus is enabled to perform the method in the first aspect.

According to a fifth aspect, a chip is provided. The chip stores an instruction. When the instruction is run on a self-driving safety evaluation apparatus, the chip is enabled to perform the method in the first aspect.

According to a sixth aspect, a computer program product is provided. The computer program product includes computer program code. When the computer program code is run by a communications unit or a transceiver and a processing unit or a processor of a self-driving safety evaluation apparatus, the self-driving safety evaluation apparatus is enabled to perform the method in the first aspect.

According to a seventh aspect, an apparatus for determining a driving risk of a vehicle is provided. The apparatus can implement functions in the method in the second aspect. The functions may be implemented using hardware, or may be implemented by executing corresponding software by hardware. The hardware or software includes units or modules that correspond to one or more of the functions.

In a possible design, the apparatus includes a processor and a transceiver. The processor is configured to support the apparatus in performing the functions in the method in the first aspect. The transceiver is configured to support communication between the apparatus and another apparatus. The apparatus may further include a memory. The memory is configured to couple to the processor, and the memory stores a program instruction and data that are necessary for the apparatus.

According to an eighth aspect, a computer readable storage medium is provided. The computer readable storage medium stores computer program code. When the computer program code is executed by a processing unit or a processor, an apparatus for determining a driving risk of a vehicle is enabled to perform the method in the second aspect.

According to a ninth aspect, a chip is provided. The chip stores an instruction. When the instruction is run on an apparatus for determining a driving risk of a vehicle, the chip is enabled to perform the method in the second aspect.

According to a tenth aspect, a computer program product is provided. The computer program product includes computer program code. When the computer program code is run by a communications unit or a transceiver and a processing unit or a processor of an apparatus for determining a driving risk of a vehicle, the apparatus for determining a driving risk of a vehicle is enabled to perform the method in the second aspect.

According to an eleventh aspect, a self-driving safety evaluation system is provided. The system includes a risk control module, a risk policy module, and a safety evaluation module. The risk control module is configured to perform the method in any optional implementation of the first aspect, to determine a risk in a self-driving mode. The risk policy module is configured to determine a risk control policy based on the risk in the self-driving mode that is determined by the risk control module, where the risk control policy is used to reduce or eliminate the risk in the self-driving mode. The safety evaluation policy module is used to evaluate safety in the self-driving mode based on the risk in the self-driving mode that is determined by the risk control module.

According to a twelfth aspect, a self-driving safety evaluation system is provided. The system includes a risk control module, a risk policy module, and a safety evaluation module. The risk control module is configured to perform the method in any optional implementation of the second aspect, to determine a risk in a self-driving mode. The risk policy module is configured to determine a risk control policy based on the risk that is the self-driving mode and that is determined by the risk control module, where the risk control policy is used to reduce or eliminate the risk in the self-driving mode. The safety evaluation policy module is used to evaluate safety in the self-driving mode based on the risk in the self-driving mode that is determined by the risk control module.

BRIEF DESCRIPTION OF DRAWINGS

FIG. 6 is a schematic diagram of a self-driving safety evaluation method according to this application.

FIG. 8 is a schematic diagram of a risk in a traffic signal light scenario according to this application.

FIG. 9 is a schematic diagram of a method for determining a driving risk of a vehicle according to this application.

DESCRIPTION OF EMBODIMENTS

The following describes technical solutions of this application with reference to the accompanying drawings.

Figure 1:
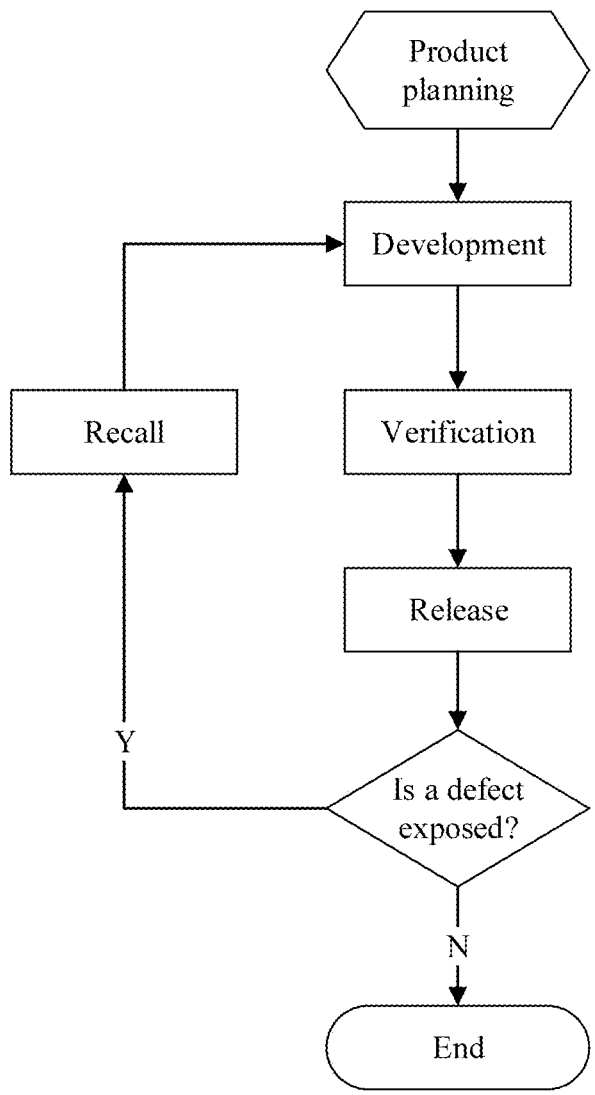
FIG. 1 is a flowchart of conventional automobile product release.

FIG. 1 is a conventional automobile product release procedure. The procedure includes product planning, development, verification, release, whether a defect is exposed, and end (that is, end of manufacturing). A safety level requirement of a self-driving system is similar to that in a conventional automobile electronics field. However, to implement the conventional release procedure shown in FIG. 1 is difficult for the self-driving system due to an unknown potential risk introduced by self-driving and an accumulated drive test mileage (million-km class) requirement introduced by driving scenario complexity.

Figure 2:
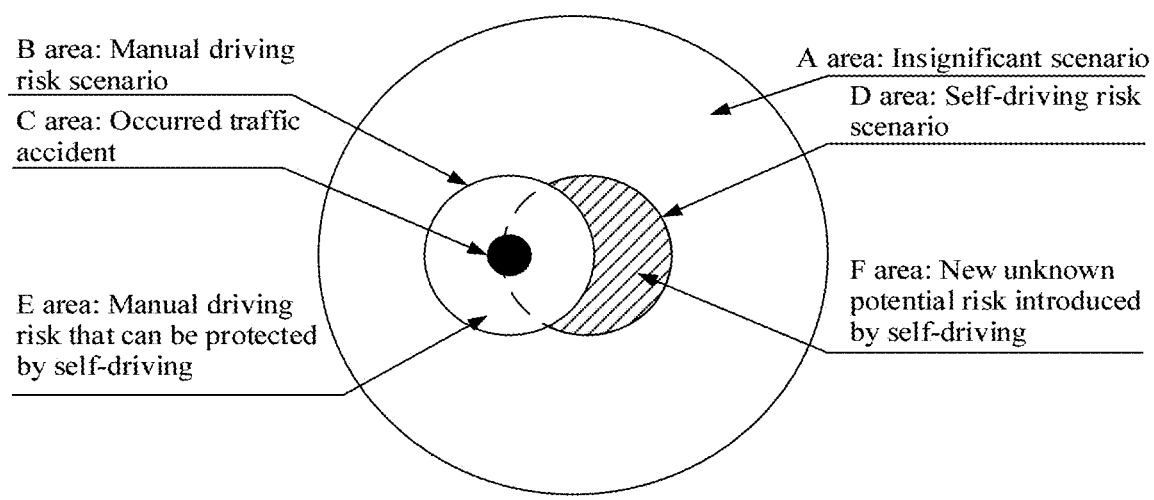
FIG. 2 is a schematic diagram of various risks of manual driving and various risks of self-driving.

FIG. 2 shows unknown potential risks introduced by self-driving. An outermost layer of circle indicates all driving scenarios, and insignificant scenarios (A area) occupy a majority of the driving scenarios. In existing knowledge, only an analysis of an already occurred traffic accident (C area) can be used to identify a risk scenario (B area) of manual driving and a risk (E area) of manual driving that can be prevented by self-driving. However, sufficient knowledge of new unknown potential risks (F area) introduced by self-driving has not been accumulated. Therefore, before the self-driving system is really put into use, to perform objective safety evaluation on the self-driving system is difficult.

Figure 3:
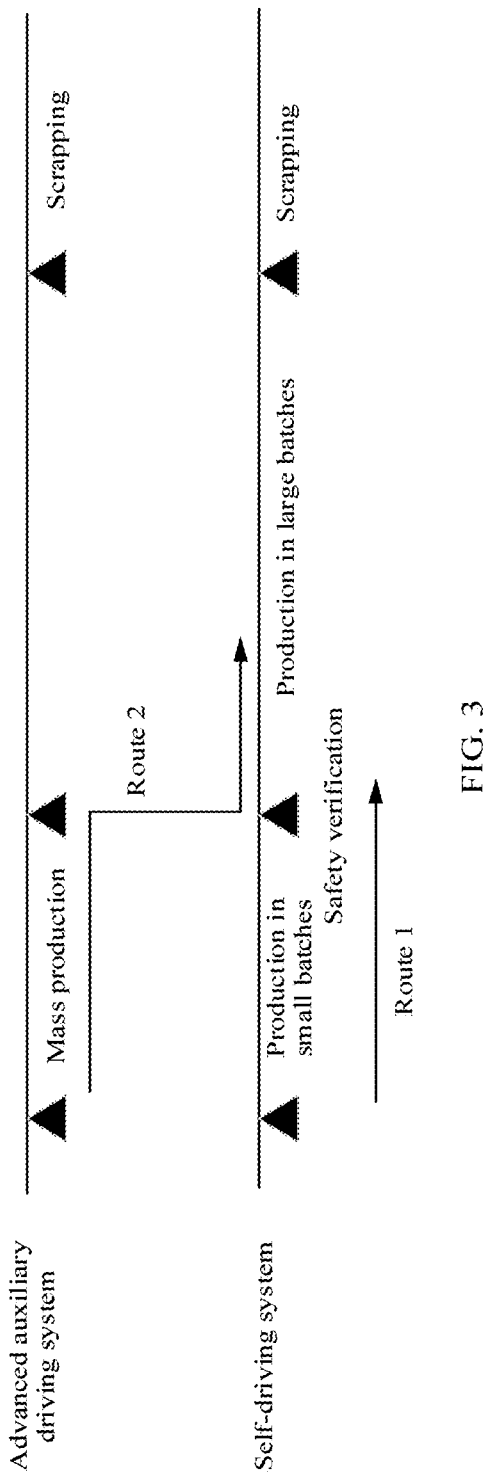
FIG. 3 is a schematic diagram of routes of performing mass production of self-driving automobiles.

To facilitate mass production of self-driving automobiles as early as possible and development of a self-driving automobile industry, some organizations propose a self-driving automobile batch-type production route map. As shown in FIG. 3, there are two self-driving automobile mass production routes.

Route 1: Automobiles on which a self-driving system is installed are produced in small batches. Safety of the self-driving system is evaluated using a safety evaluation method, to attempt to verify the safety of the self-driving system. When safety performance of the self-driving system can meet a requirement, it is determined that a phase in which production is performed in large batches can be entered.

Route 2: Automobiles on which an advanced auxiliary driving system is installed are produced in mass production, and safety of the advanced auxiliary driving system is evaluated using a safety evaluation method. When a function of an advanced auxiliary driving system reaches a reliable safety level, an automobile on which the advanced auxiliary driving system is installed may be upgraded to a self-driving automobile.

Route 1 and Route 2 respectively represent two routes for mass production of self-driving automobiles. In a process in which a self-driving automobile travels, the vehicle identifies, using a risk identification method, a risk caused by a self-driving system defect, updates a risk control policy in a timely manner, and takes risk control measures before the risk develops into an accident, to reduce an accident occurrence probability.

The following describes a self-driving safety evaluation method, apparatus, and system provided in this application.

Figure 4:
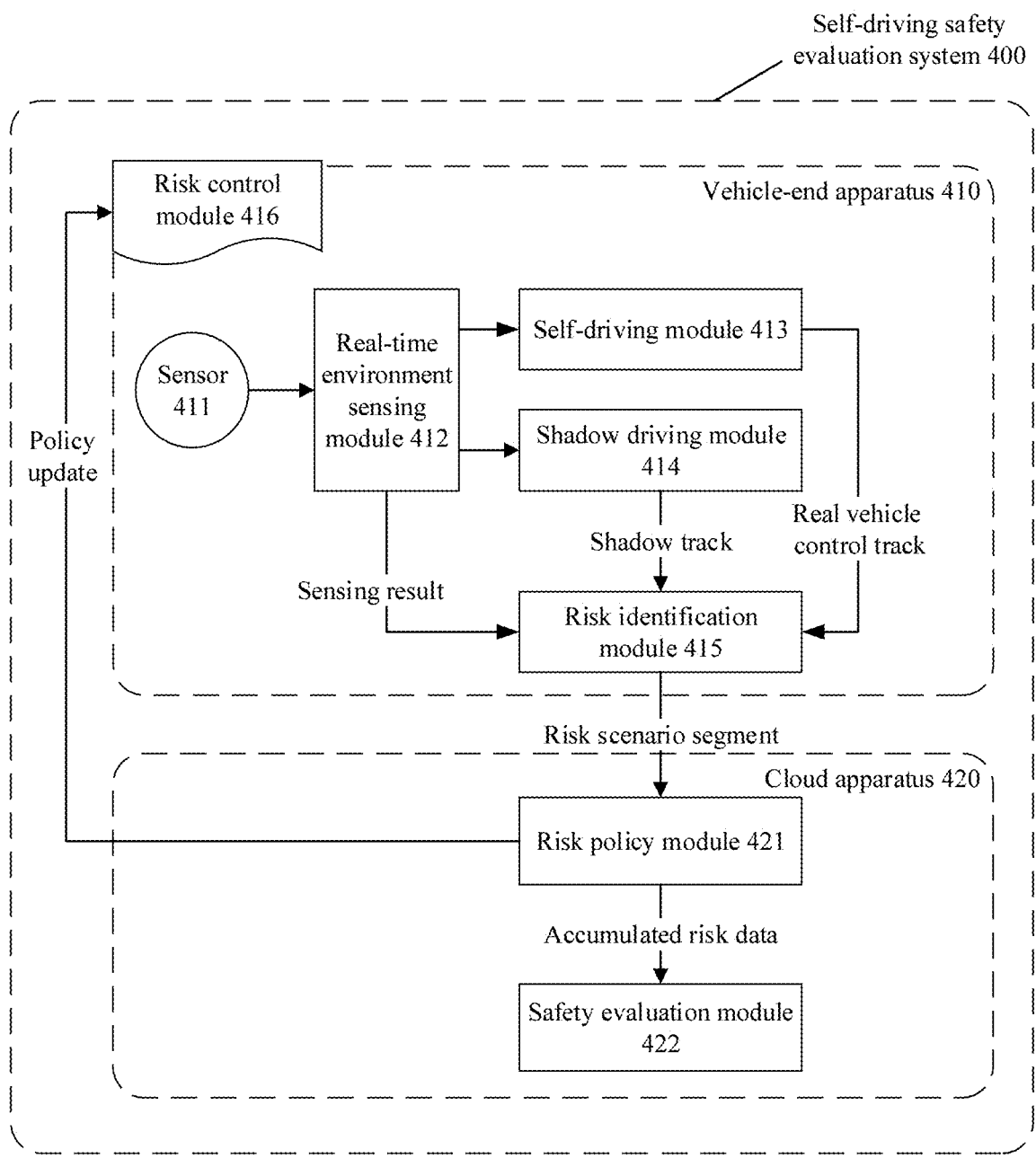
FIG. 4 is a schematic diagram of a self-driving safety evaluation system according to this application.

FIG. 4 shows a self-driving safety evaluation system 400 according to this application. The system 400 includes a vehicle-end apparatus 410 and a cloud apparatus 420.

The vehicle-end apparatus 410 includes a sensor 411, a real-time environment sensing module 412, a self-driving module 413, a shadow driving module 414, a risk identification module 415, and a risk control module 416.

The cloud apparatus 420 includes a risk policy module 421 and a safety evaluation module 422.

The sensor 411 is configured to collect environment information. The sensor 411 may be, for example, a camera or a radar.

The real-time environment sensing module 412 is configured to process the environment information collected by the sensor 411 for subsequent use of a module. For example, the camera detects that there is an obstacle in front of the vehicle, and the radar also detects that there is an obstacle in front of the vehicle. The obstacles detected by the camera and the radar may be a same obstacle. The real-time environment sensing module 412 needs to determine, based on information collected by the camera and the radar, how many obstacles there are in front.

The self-driving module 413 is configured to control the vehicle to travel based on data (that is, a sensing result) output by the real-time environment sensing module 412, and output a vehicle control track of self-driving.

The shadow driving module 414 is configured to when an automobile is manually driven, simulate self-driving based on the data output by the real-time environment sensing module 412, and generate a shadow track. The following describes in detail a working process of the shadow driving module 414.

The risk identification module 415 is configured to identify risk scenarios of manual driving, self-driving, and shadow driving, to generate risk data. The risk identification module 415 identifies a manual driving risk based on the sensing result output by the real-time environment sensing module 412, identifies a self-driving risk based on the vehicle control track of self-driving that is output by the self-driving module 413, and identifies a shadow driving risk based on the shadow track output by the shadow driving module 414.

The risk policy module 421 is configured to formulate a risk control policy for the already identified potential risks of a self-driving system. The risk control module 416 is configured to take measures based on the risk control policy issued by the cloud to reduce or eliminate the risks.

The safety evaluation module 422 is configured to evaluate safety of the self-driving system using accumulated risk data.

FIG. 4 is an example description of the system 400 from a perspective of function division. Functions of various modules may be implemented in a form of software, or may be implemented in a form of hardware, or may be implemented in a form of a combination of software and hardware. For a specific form in which the functions of the modules in the system 400 are implemented may be determined based on an actual case. This is not limited in this application.

Without loss of generality, FIG. 4 divides the system 400 into the vehicle-end apparatus and the cloud apparatus, but an architecture of the system 400 is not limited thereto. For example, the risk identification module 415 may be deployed in the cloud apparatus 420, and the vehicle-end apparatus 410 does not need to perform risk identification processing. In this way, load of a processor of the vehicle-end apparatus 410 may be reduced. For another example, the risk policy module and the safety evaluation module may be deployed in the vehicle-end apparatus 410. In this way, even if the vehicle-end apparatus 410 is in an offline state, the vehicle-end apparatus 410 may also formulate a risk policy based on the already identified risks caused by the self-driving system, and evaluate safety of the self-driving system.

Figure 5:
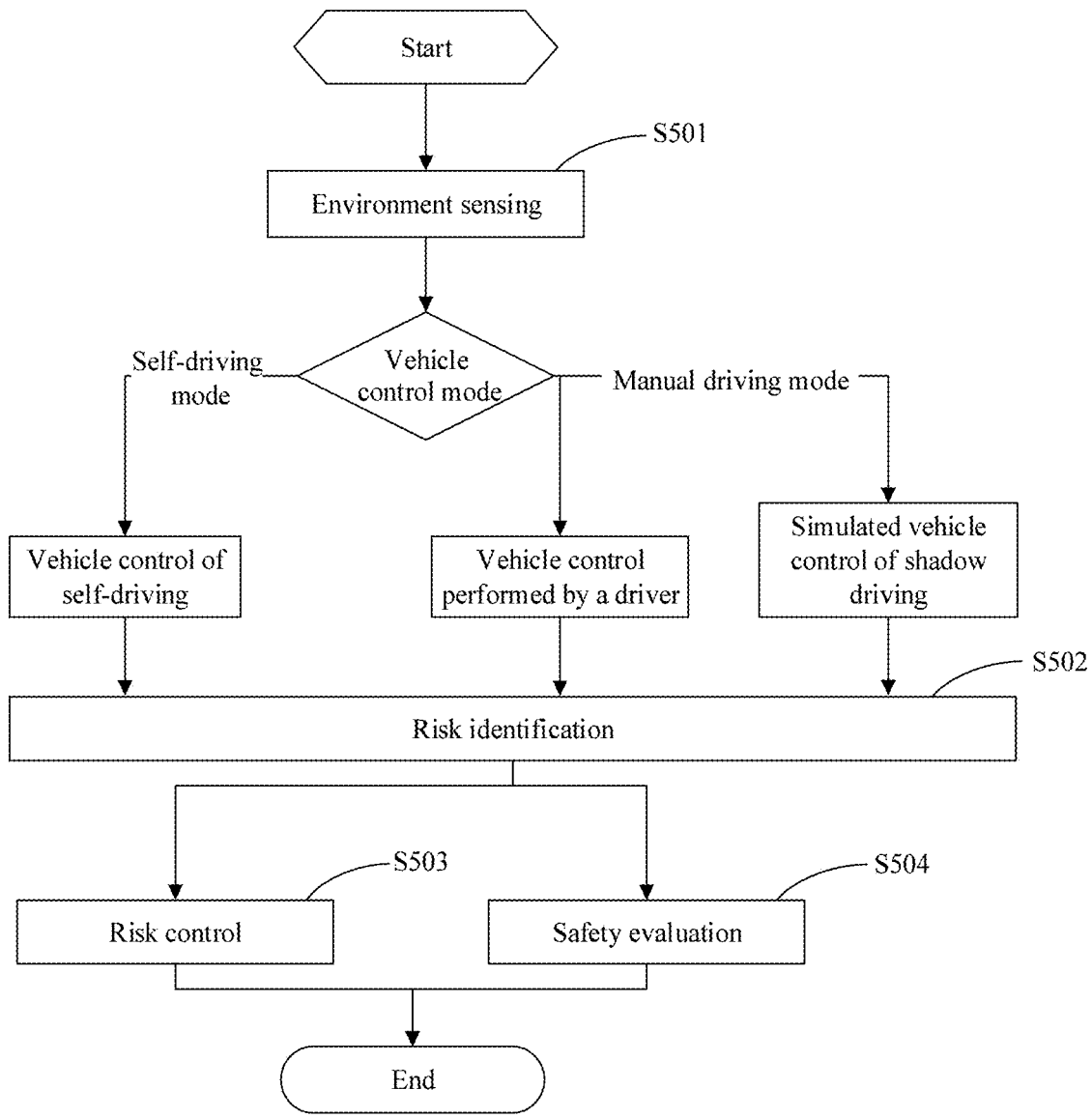
FIG. 5 is a schematic flowchart of a self-driving safety evaluation method according to this application.

Based on the system 400, FIG. 5 is a schematic flowchart of a self-driving safety evaluation method 500 according to this application.

In the method 500, S501 may be performed by the sensor 411. The sensor 411 collects real-time information, and reconstructs static and dynamic environment data, and track data of a vehicle (which may also be referred to as an "ego vehicle") in which the sensor 411 is located.

S502 may be performed by the risk identification module 415, to identify risks in different vehicle control modes. If the ego vehicle is in a self-driving mode, the risk identification module 415 calculates a risk feature of self-driving based on a vehicle control track of self-driving. If the vehicle is in a manual driving mode, the risk identification module 415 calculates a risk feature of manual driving based on a track of vehicle control performed by a driver, and calculates a risk feature of shadow driving based on a shadow track.

S503 may be performed by the risk control module 416. The risk control module 416 identifies a potential defect of a self-driving system based on the risk feature in the self-driving mode and the risk feature in the shadow driving mode that are obtained through calculation by the risk identification module 415, and updates the risk control policy.

S504 may be performed by the safety evaluation module 422. The safety evaluation module 422 evaluates safety in the self-driving mode based on accumulated risk features in various driving modes, where an evaluation result is used as a basis for safety verification and mass production and release.

The following further describes in detail a self-driving safety evaluation solution provided in this application based on a procedure of the method 500.

FIG. 6 shows a self-driving safety evaluation method 600 according to this application. The method 600 includes the following steps.

S610. Obtain $r_b$ and $r_c$, where $r_b$ is a risk value of a vehicle in a shadow driving mode in a first measurement unit, $r_c$ is a risk value of the vehicle in a self-driving mode based on a preset route in the first measurement unit, the shadow driving mode is a self-driving mode of the vehicle that is based on a real-time route, the real-time route is a route predicted based on a location and a movement parameter of the vehicle in a manual driving mode, and the first measurement unit is a time period or a distance.

S620. Determine $R_B$ based on $r_b$, where $R_B$ is a risk value of the vehicle in the shadow driving mode in a plurality of measurement units, and the plurality of measurement units include the first measurement unit.

S630. Determine $R_C$ based on $r_c$, where $R_C$ is a risk value of the vehicle in the self-driving mode based on the preset route in the plurality of measurement units, and $R_B$ and $R_C$ are used to determine whether safety in the self-driving mode of the vehicle meets a requirement.

The method 600 may be performed by the cloud apparatus 420, or may be performed by a vehicle-end apparatus in which a safety evaluation module is configured.

In S610, $r_b$ and $r_c$ reflect a probability that a risk develops into an accident, and may be a value of a probability that a risk develops into an accident, or may be another type of value that can be used to quantify a self-driving risk. Measurement units of $r_b$ and $r_c$ may be time periods, or may be distances.

A risk behavior may be defined as an explicit or implicit driving behavior (including manual driving, self-driving, and shadow driving) that violates a safety goal (SG). "Explicit" indicates that a driving behavior has developed into an accident, and "implicit" indicates that a driving behavior may develop into an accident. Therefore, identification of the risk behavior includes the following.

Identification of an explicit risk, for example, a collision or violating a red and green light rule.

Identification of an implicit risk, for example, not reserving a sufficient safe distance from a front vehicle, still continuously accelerating when a maximum value of a safe travelling speed is reached, or not decelerating in a timely manner at a crossroad. The implicit risk further includes abnormal driving behaviors. These driving behaviors may cause a failure of timely reaction by another vehicle, resulting in a passive accident, for example, an abnormal acceleration or deceleration and not travelling in a road direction.

Automatic identification of a risk scenario can be achieved by defining and calculating features of these risk behaviors in corresponding scenarios.

The SG includes but is not limited to the following definitions.

SG 1: Avoid colliding with a person or another object.
SG 2: Comply with a traffic signal light rule.
SG 3: Avoid rushing out of a road boundary.
SG 4: Avoid non-conventional travelling (including overspeed, abnormal acceleration or deceleration, and turning).

For each SG, when an explicit risk occurs, a risk value may be defined as 1, when no risk occurs, a risk value may be defined as 0, and a risk value of an implicit risk is a value greater than 0 and less than 1. The following describes in detail a method for calculating a risk value in each scenario.

The first measurement unit is any measurement unit. The self-driving mode based on the preset route is the self-driving mode shown in FIG. 5. The mode is a driving mode in which the self-driving module 413 controls a vehicle. After obtaining a start point and an end point of a distance (that is, the preset route), the self-driving module 413 controls the vehicle to travel the distance, and a driver does not participate in driving. The driving mode based on the real-time route is a self-driving mode simulated by the shadow driving module 414 in a process in which the driver controls the vehicle to travel. The shadow driving module 414 continuously corrects a shadow track based on a location and a movement parameter of the vehicle that exist when vehicle control is performed by the driver, to avoid a case in which a route of self-driving passes through a B street while a route of vehicle control performed by the driver passes through an A street such that safety evaluation on self-driving is more objective.

In S620 and S630, $R_B$ may be, for example, an average value obtained by dividing a sum of $r_b$ of the plurality of measurement units by the plurality of measurement units, or may be an average value obtained by dividing a sum of products of $r_b$ of all measurement units and a weighting coefficient by the plurality of measurement units. Similarly, $R_C$ may be, for example, an average value obtained by dividing a sum of $r_c$ of the plurality of measurement units by the plurality of measurement units, or may be an average value obtained by dividing a sum of products of $r_c$ of all measurement units and a weighting coefficient by the plurality of measurement units. $R_B$ and $R_C$ may alternatively be values obtained through calculation using another method, and a method for calculating $R_B$ and $R_C$ is not limited in this application.

In conclusion, in the self-driving safety evaluation method provided in this application, in addition to collection of risk data generated in the self-driving mode based on the preset route, the risk data generated by the self-driving mode based on the real-time route is further collected. The real-time route is the self-driving route (that is, the shadow track) predicted based on the location and the movement parameter of the vehicle in the manual driving mode. For example, when the driver controls the vehicle and changes the route, the shadow driving module 414 may re-plan the self-driving route based on the route of vehicle control performed by the driver, and determine safety of self-driving based on the re-planned self-driving route, thereby more truly evaluating the safety of self-driving.

Optionally, the method 600 further includes the following steps.

Step 1. Calculate a sum of $R_B$ and $R_C$.

Step 2. When the sum of $R_B$ and $R_C$ is less than or equal to a self-driving risk threshold, determine that safety of the vehicle in the self-driving mode meets a requirement.

The foregoing embodiment may be implemented by an apparatus for determining $R_B$ and $R_C$, without a need of sending $R_B$ and $R_C$ to another device and evaluating, by the other device, safety of the vehicle in the self-driving mode, thereby improving real-time performance of safety evaluation on the self-driving mode.

In step 2, the self-driving risk threshold is a threshold of a risk value in the self-driving mode in each measurement unit. The self-driving risk threshold may be a value that is set based on a statistical result, for example, a maximum value of average self-driving risk values per km in a mileage of one million km travelled by the vehicle. If the value of $R_B+R_C$ is less than or equal to the maximum value after the vehicle travels the one million km, a self-driving function of the vehicle meets the safety requirement, and mass production can be implemented. If the value of $R_B+R_C$ is greater than the maximum value after the vehicle travels the one million km, the self-driving function of the vehicle cannot meet the safety requirement, mass production cannot be implemented, and improvement needs to be made.

Mileages respectively corresponding to $R_B$ and $R_C$ in $R_B+R_C$ may be set for every million km. For example, the mileage corresponding to $R_C$ in $R_B+R_C$ may be set to be no less than one hundred thousand km for every million km such that the safety of self-driving can be more objectively and truly evaluated.

In an optional implementation, the self-driving risk threshold is $a(R_A+R'_A)$, where a is a risk tolerance coefficient, $R_A$ is, for example, an average value of risk values of the vehicle in the manual driving mode in the plurality of measurement units, a road section through which the vehicle passes in the plurality of measurement units is a first road section, and $R'_A$ is, for example, an average value of risk values of the vehicle passing through the first road section outside the plurality of measurement units based on the manual driving mode.

A risk value of self-driving may be compared with a risk value of manual driving, and a tolerance coefficient that the risk value of the self-driving can be accepted may be set, to determine whether safety of self-driving satisfies a requirement.

For example, $R_A$ is a risk value obtained after the vehicle travels five hundred thousand km in the manual driving mode, a road section through which the vehicle travels the five hundred thousand km is a first road section, and $R'_A$ is a risk value obtained after the vehicle passes through the first road section again in the manual driving mode. $R_B+R_C$ is a risk value obtained after the vehicle travels one million km in the self-driving mode. a indicates that when travelled distances have a same length, the risk value of self-driving needs to be less than a product of the risk value of manual driving and a, and only in this case, it can be determined that the safety in the self-driving mode meets the requirement, and a is usually a constant greater than 0 and less than 1.

In an optional implementation, determining $R_B$ based on $r_b$ and determining $R_C$ based on $r_c$ include the following step.

Step 3. Determine $R_B$ or $R_C$ based on $R_i = (\Sigma_{event} s_{event} \times r_i)/X$, where event represents a risk scenario, $s_{event}$ represents a coefficient of a severity degree of an accident in the risk scenario, X represents the plurality of measurement units, when $r_i$ represents $r_b$, $R_i$ represents $R_B$, and when $r_i$ represents $r_c$, $R_i$ represents $R_C$.

$s_{event}$ reflects severity degrees of accidents in different risk scenarios, $r_i$ reflects a probability that a risk develops into an accident, and $\Sigma$ reflects an accumulation of risks of the plurality of measurement units.

For example, in a collision scenario, a severity degree of colliding with a person is far higher than a severity degree of colliding with another object. Therefore, $s_{event}$ in a case of colliding with a person may be set to 1, and $s_{event}$ in a case of colliding with another object may be selected from 0.1 to 0.9 based on a property of the object.

For another example, behaviors such as violation of a traffic rule, deviation from a road range or a direction in travelling, overspeed, and violation of a conventional driving rule are several main factors that constitute an accident. Therefore, in a solution, $s_{event}$ may be defined based on accident statistics data. When any one of the foregoing behaviors occurs on a vehicle, corresponding $s_{event}$ is equal to 0.01.

X may be a mileage travelled by the vehicle or a time for which the vehicle travels, where the mileage or the time corresponds to $R_i$, and $R_i$ reflects an average probability that a risk develops into an accident in each measurement unit (for example, per kilometer or per hour (km/h)). The foregoing formula can objectively reflect a self-driving risk.

In an optional implementation, obtaining $r_b$ and $r_c$ includes the following steps.

Step 4. When the risk scenario is the collision scenario, determine $r_b$ and $r_c$ based on at least one of the following parameters: a speed $\Delta v$ of the vehicle relative to a collision object, a TTC between the vehicle and the collision object that is estimated based on a movement track of the collision object, a THW of the vehicle that is estimated based on a distance between the vehicle and the collision object, and the distance between the vehicle and the collision object, where $\Delta v$ is positively correlated to $r_b$ or $r_c$, the TTC is negatively correlated to $r_b$ or $r_c$, the THW is negatively correlated to $r_b$ or $r_c$, and the distance between the vehicle and the collision object is negatively correlated to $r_b$ or $r_c$.

In the collision scenario, a higher relative movement speed indicates a higher probability that a risk develops into an accident, that is, $\Delta v$ is positively correlated to $r_b$ or $r_c$, a longer TTC indicates a higher possibility of adjusting a travelling route by the vehicle to avoid a collision and a lower probability of occurrence of a collision, and therefore TTC is negatively correlated to $r_b$ or $r_c$, a longer available THW indicates a smaller probability of occurrence of a collision, and therefore THW is negatively correlated to $r_b$ or $r_c$, and a longer distance between the vehicle and the collision object indicates a higher possibility of adjusting the travelling route by the vehicle to avoid a collision and a lower probability of occurrence of a collision, and therefore the distance between the vehicle and the collision object is positively correlated to $r_b$ or $r_c$.

Figure 7:
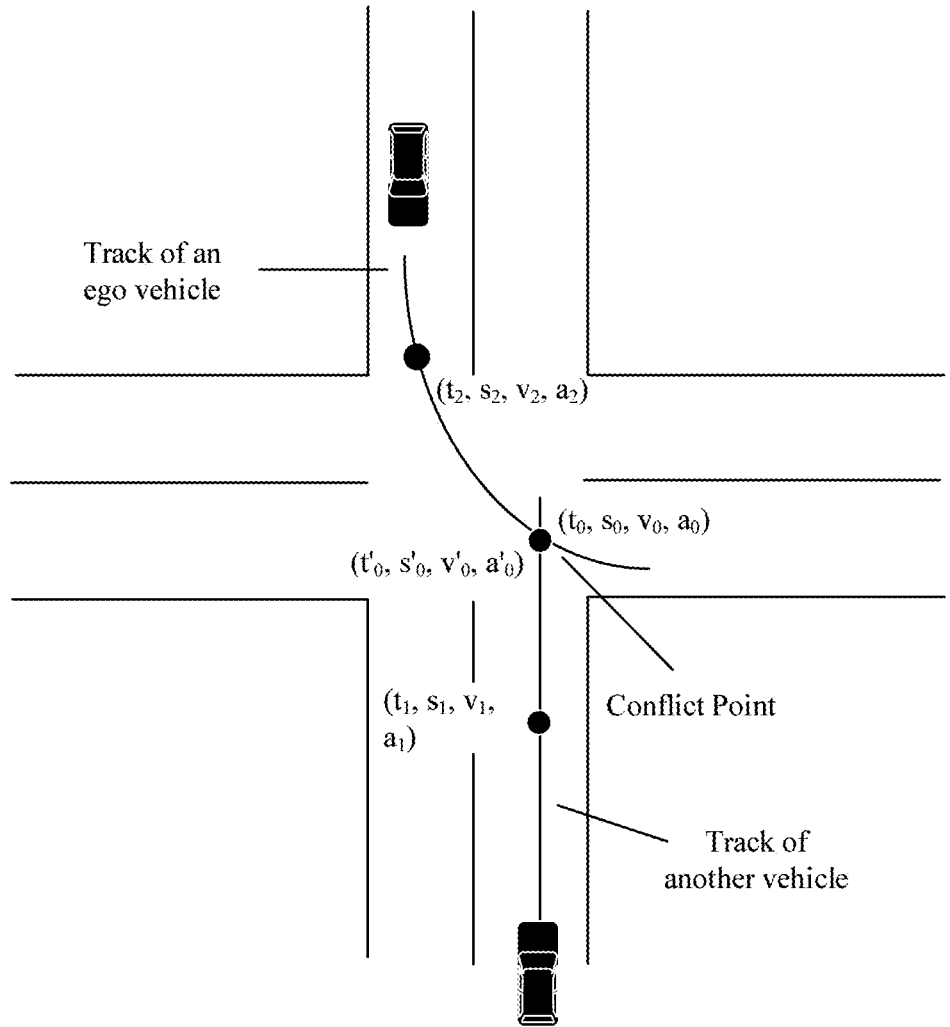
FIG. 7 is a schematic diagram of a risk in a collision scenario according to this application.

FIG. 7 is a schematic diagram of a risk in a collision scenario according to this application.

In FIG. 7, a track of an ego vehicle is a line segment from a state (t2, s2, v2, a2) to a state (t0, s0, v0, a0), and a track of another vehicle is a line segment from a state (t1, s1, v1, a1) to a state (t'0, s'0, v'0, a'0). The two vehicles travel toward each other, and collide at a cross point of the two lines shown in the figure.

Both the foregoing two tracks are tracks predicted by the ego vehicle. The ego vehicle identifies, based on a sensing result of a sensor, an object that has an intersection with the track of the ego vehicle in a future time period (for example, 5s). A maximum value of risk values of collision between the ego vehicle and the foregoing object is used as a collision risk value in the future time period.

For example, $r_b$ and $r_c$ may be determined based on $r_{SG1}=f(t)_{max}$, where $r_{SG1}$ is $r_b$ or $r_c$ in the collision scenario, $t \in \{t_{event}, h(t_{event},obj)=1\}$, $f(t)=\Delta v(t)*\exp(-\min\{r_0 TTC(t), r_1 THW(t), r_2 s\})$, $\{t_{event}, h(t_{event},obj)=1\}$ represents a time period in which a collision risk occurs, TTC(t) represents a TTC at a t moment, THW(t) represents a THW at the t moment, $$TTC = \frac{-v - \sqrt{v^2 - 2ax}}{a},$$

$$THW = \frac{v^2}{2a_m x},$$

$r_0$, $r_1$, and $r_2$ are each a normalized parameter, v is a speed of the vehicle at the t moment, $\Delta v(t)$ is $\Delta v$ at the t moment, exp is an exponent whose base is a natural constant, and s represents the distance between the vehicle and the collision object.

In the foregoing formula, $t \in \{t_{event}, h(t_{event},obj)=1\}$ represents an identified time period in which a collision risk occurs, $h(t_{event},obj)$ represents that a collision risk event (obj) causes a potential collision event in a time period ($t_{event}$), or it may be understood as that $h(t_{event},obj)$ represents that occurrence of a collision risk event (obj) causes an increase in a probability of occurrence of a collision in a time period ($t_{event}$), $h(t_{event},obj)=1$ represents that the collision risk event (obj) occurs, and $h(t_{event},obj)=0$ represents that no collision risk event occurs. A risk event usually lasts for a time period from occurrence to disappearance. Therefore, when identifying that a collision risk event (that is, $h(t_{event},obj)=1$) occurs, the vehicle-end apparatus 410 or cloud apparatus 420 may select a time period $t_{event}$ near a moment at which the risk event is identified, to calculate a risk value in the time period. The time period includes the moment at which the collision risk event is identified. Each normalized parameter is used to indicate a weight of each parameter. For example, each normalized parameter may be a value greater than or equal to 0 and less than or equal to 1.

For example, when a relative speed of the two vehicles is greater than 40 km/h, if a collision occurs, there is an extremely high probability of personal casualty. If an expected collision time (that is, TTC) of the two vehicles is less than is, there is an extremely high probability that a collision between the two vehicles cannot be avoided. When THW is less than Is, if the other vehicle is braking, there is an extremely high probability that the ego vehicle cannot avoid a collision between the two vehicles.

The foregoing "a relative speed is greater than 40 km/h", "TTC is less than is", and "THW is less than Is" are all collision risk events (obj). A collision occurrence moment may be predicted, and a time period ($t_{event}$) near the predicted collision occurrence moment may be selected to calculate a collision risk value (a collision occurrence probability) in the time period. A maximum value (that is, $f(t)_{max}$) of a plurality of collision risk values in the time period is used as the collision risk value in the time period.

In an optional implementation, obtaining $r_b$ and $r_c$ includes the following steps.

Step 5. When the risk scenario is a traffic signal light scenario, determine $r_b$ and $r_c$ based on a speed of the vehicle and a distance from the vehicle to a traffic signal light, where the speed of the vehicle is positively correlated to $r_b$ or $r_c$, and the distance from the vehicle to the traffic signal light is negatively correlated to $r_b$ or $r_c$.

In the traffic signal light scenario, a higher speed of the vehicle indicates a higher probability of violating a traffic signal light rule (for example, running a red light), and therefore the speed of the vehicle is positively correlated to $r_b$ or $r_c$, and a longer distance from the vehicle to the traffic signal light indicates a longer time used by the vehicle to change a travelling status and a lower probability of running the traffic signal light, and therefore the distance from the vehicle to the traffic signal light is negatively correlated to $r_b$ or $r_c$.

FIG. 8 is a schematic diagram of a risk in a traffic signal light scenario according to this application.

A risk in the traffic signal light scenario is mainly violation of a rule indicated by a traffic signal light, and a corresponding risk value may be obtained based on a speed of an ego vehicle. As shown in FIG. 8, a distance of 50 meters (m) between the ego vehicle and the traffic signal light, a distance s from the vehicle to a stop line at an intersection, a speed v of the ego vehicle, and an acceleration a of the vehicle constitute an ego vehicle status. The right diagram shows a distance-speed curve of the ego vehicle. When the traffic signal light shows a no-passing signal, the ego vehicle needs to decelerate, and reduce the speed to 0 before the stop line. Different accelerations constitute different speed-distance curves.

When it is predicted that the ego vehicle can stop before the stop line when a common acceleration is used, it is determined that the ego vehicle in the current status has no risk of running the traffic signal light. The common acceleration is an acceleration whose absolute value is less than an absolute value of a preset acceleration. For example, a value of the preset acceleration is 0.4 g, and the ego vehicle can stop before the stop line if using an acceleration of −0.3 g. In this case, $r_b$ or $r_c$ of the ego vehicle is equal to 0.

When it is predicted that the ego vehicle cannot stop before the stop line even if a maximum acceleration is used, it is determined that the ego vehicle in the current status inevitably causes an accident of running the traffic signal light, that is, a risk in this case is an explicit risk, and $r_b$ or $r_c$ is equal to 1.

When a speed-distance curve of the ego vehicle is located between curve 1 and curve 2 shown in FIG. 8, the ego vehicle has an implicit risk of running the traffic signal light. In this case, a larger absolute value of an acceleration required for the ego vehicle to reduce the speed to 0 before the stop line indicates a larger value of $r_b$ or $r_c$.

For example, $r_b$ and $r_c$ may be determined based on $r_{SG2}=f(t)_{max}$, where $r_{SG2}$ is $r_b$ or $r_c$ in the traffic signal light scenario, $t \in \{t_{event}, h(t_{event},Light)=1\}$, $$\begin{cases} 1, & \text{when } v(t)^2 \geq 2 \text{ g } s(t) \\ \dfrac{r_3 v(t)^2}{\text{g } s(t)}, & \text{when } 0.8 \text{ g } s(t) \leq v(t)^2 \leq 2 \text{ g } s(t) \\ 0, & \text{when } v(t)^2 \leq 0.8 \text{ g } s(t) \end{cases}$$

$r_3$ is a normalized parameter, v(t) represents a speed of the vehicle at a t moment, g is a gravitational acceleration constant, and s(t) represents a distance from the vehicle to the traffic signal light at the t moment.

In the foregoing formula, $t \in \{t_{event}, h(t_{event},Light)=1\}$ represents an identified time period in which a traffic signal light scenario risk occurs, $h(t_{event},Light)$ represents that a probability of occurrence of violating a traffic signal light rule increases in a time period ($t_{event}$) due to occurrence of a traffic signal light risk event (Light), $h(t_{event},Light)=1$ represents that a traffic signal light risk event (Light) occurs, and $h(t_{event},Light)=0$ represents that no traffic signal light risk event occurs. A risk event usually lasts for a time period from occurrence to disappearance. Therefore, when identifying that a risk event occurs (that is, $h(t_{event},Light)=1$) in the traffic signal light scenario, the vehicle-end apparatus 410 or the cloud apparatus 420 may select a time period $t_{event}$ near a moment at which the risk event is identified, to calculate a risk value in the time period. The time period includes the moment at which the risk event is identified. The normalized parameter is used to represent a weight of a parameter. For example, each normalized parameter may be a value greater than or equal to 0 and less than or equal to 1.

For example, if the vehicle is 50 m away from the intersection, a traffic signal light at the intersection displays a no-passing signal, and a speed of the vehicle is 100 km/h, there is an extremely high probability of occurrence of a risk of running the traffic signal light (for example, running a red light). The foregoing "the vehicle is 50 m away from the intersection, a traffic signal light at the intersection displays a no-passing signal, and a speed of the vehicle is 100 km/h" are traffic signal light risk events (Light). A moment at which a red light is run may be predicted, and a time period ($t_{event}$) near the predicted moment at which the red light is run may be selected to calculate a red light running risk value (that is, a probability of occurrence of running the red light) in the time period. A maximum value (that is, $f(t)_{max}$) of a plurality of red light running risk values in the time period is selected as a red light running risk value in the time period.

In an optional implementation, obtaining $r_b$ and $r_c$ includes the following steps.

Step 6. When the risk scenario is a scenario in which the vehicle rushes out of a road boundary, determine $r_b$ and $r_c$ based on an estimated time taken by the vehicle to rush out of a lane, where the estimated time taken by the vehicle to rush out of the lane is negatively correlated to $r_b$ or $r_c$.

In the scenario in which the vehicle rushes out of a road boundary, a longer estimated time taken by the vehicle to rush out of the lane indicates a longer time for the vehicle to adjust the travelling status, and a lower probability of rushing out of the road by the vehicle. Therefore, the estimated time taken by the vehicle to rush out of the lane is negatively correlated to $r_b$ or $r_c$. For example, $r_b$ and $r_c$ may be determined based on $$r_{SG3} = \begin{cases} e^{-r_4 t_{lc}}, & \text{when } t_{lc} < TLC_{threshold} \\ 0, & \text{when } t_{lc} \geq TLC_{threshold} \end{cases},$$

where $r_{SG3}$ is $r_b$ or $r_c$ in the scenario in which the vehicle rushes out of a road boundary, $TLC_{threshold}$ represents a critical value of the time required by the vehicle to rush out of a road, $$t_{lc} = \frac{\left(y \pm \dfrac{w_{road}}{2}\right)}{(v_{long}(\phi - \phi_d) + v_{lat})},$$

e is a natural constant, $t_{lc}$ is the estimated time taken by the vehicle to rush out of the lane, y is a lateral offset of the vehicle at the road boundary, $W_{road}$ is a width of the road, $v_{long}$ is a longitudinal speed of the vehicle, $v_{lat}$ is a lateral speed of the vehicle, $\phi-\phi_d$ represents an angle between a heading direction of the vehicle and a road tangent direction, $r_4$ is a normalized parameter, and the normalized parameter represents a weight of a parameter.

In an optional implementation, obtaining $r_b$ and $r_c$ includes the following steps.

Step 7. the risk scenario is a non-conventional travelling scenario (for example, a travelling scenario in which the vehicle currently has a lateral acceleration), determine $r_b$ and $r_c$ based on at least one of the following parameters a longitudinal acceleration of the vehicle, a lateral acceleration of the vehicle, and a speed of the vehicle, where the longitudinal acceleration of the vehicle is positively correlated to $r_b$ or $r_c$, the lateral acceleration of the vehicle is positively correlated to $r_b$ or $r_c$, and the speed of the vehicle is positively correlated to $r_b$ or $r_c$. The longitudinal acceleration is an acceleration whose acceleration direction is the same as or opposite to a speed direction (for example, an acceleration obtained by stepping on an accelerator or stepping on a brake during straight travelling). The lateral acceleration is an acceleration whose acceleration direction has a non-zero angle with a speed direction (for example, an acceleration that causes a drift of the vehicle when the vehicle is turning).

A larger longitudinal acceleration indicates a higher probability of overspeed of the vehicle or an abrupt brake of the vehicle. Therefore, the longitudinal acceleration of the vehicle is positively correlated to $r_b$ or $r_c$. A larger lateral acceleration indicates a higher probability of abrupt turning of the vehicle. Therefore, the lateral acceleration of the vehicle is positively correlated to $r_b$ or $r_c$. A higher speed of the vehicle indicates a higher probability of occurrence of non-conventional travelling such as overspeed. Therefore, the speed of the vehicle is positively correlated to $r_b$ or $r_c$.

For example, $r_b$ and $r_c$ may be determined based on $r_{SG4}=r_5$, where $r_{SG4}$ is $r_b$ or $r_c$ in a non-conventional travelling scenario, $(|a_{long}|>a_{threshold1})||(|a_{lat}|>a_{threshold2})||(v \geq v_{safe})$, $|a_{long}|$ represents an absolute value of the longitudinal acceleration of the vehicle, $|a_{lat}|$ represents an absolute value of the lateral acceleration of the vehicle, $a_{threshold1}$ represents a threshold of the lateral acceleration in a safe driving status, for example, may be 0.5 g, $a_{threshold2}$ represents a threshold of the longitudinal acceleration in the safe driving status, for example, may be 0.7 g, v represents the speed of the vehicle, $v_{safe}$ represents a speed threshold in the safe driving status, and may be determined by referring to a road speed limit, and $r_s$ is a normalized parameter.

In the foregoing formula, $(|a_{long}|>a_{threshold1})\|(|a_{lat}|>a_{threshold2})\|v\geq v_{safe})$ represents that at least one of the lateral acceleration, the longitudinal acceleration, and the speed of the vehicle exceeds a corresponding threshold.

The foregoing describes in detail the self-driving safety evaluation method provided in this application. If information received by the cloud apparatus 420 from the vehicle-end apparatus 410 is $r_b$ or $r_c$, the cloud apparatus 420 does not need to perform step 4 to step 7. If information received by the cloud apparatus 420 from the vehicle-end apparatus 410 is data sensed by the sensor, the cloud apparatus 420 further needs to perform step 4 to step 7 to obtain $r_b$ and $r_c$.

It should be understood that the foregoing embodiment describes only the solution for generating $r_b$ or $r_c$, and step 4 to step 7 are also applicable to calculating a risk value $r_a$ of manual driving.

It can be learned from the method 600 that an important factor affecting a technical effect of the self-driving safety evaluation method is whether a risk value can reflect an actual risk level. The following describes in detail a method for determining a driving risk of a vehicle provided in this application.

FIG. 9 shows a method 900 for determining a driving risk of a vehicle according to this application. The method 900 is applied to a vehicle having a self-driving mode and a manual driving mode, and the method 900 includes the following steps.

S910. Determine a driving mode and a risk scenario of the vehicle in a time period, where a start point of the time period is a first moment, an end point of the time period is a second moment, and the driving mode includes the self-driving mode and/or the manual driving mode.

S920. Determine a risk value in the driving mode in the time period based on a risk identification manner corresponding to the risk scenario at a current moment, where the current moment is after the first moment, and the current moment is before the second moment.

The method 900 may be performed, for example, by the vehicle-end apparatus 410. The vehicle-end apparatus 410 selects a time period from a plurality of time periods required for the vehicle to travel a distance, and determines, at a moment (that is, the current moment) in the time period, a risk value in a corresponding driving mode in the time period using known travelling information and predicted travelling information. For example, the determined time period is one second, and the current moment is a moment of 0.4 s. If an overspeed travelling status occurs in the past 0.4 s, the vehicle may determine that the risk value of non-conventional driving in the driving mode in the time period is 1, that is, a probability of occurrence of overspeed is 100%. If no overspeed travelling status occurs in the past 0.4 s, and the vehicle determines, based on a current speed and acceleration of the vehicle, that a vehicle speed in future 0.6 s is to remain in a legal travelling speed, the vehicle may determine that the risk value of non-conventional driving in the time period is a value less than 1, that is, the probability of occurrence of overspeed is less than 100%. In this embodiment, a time period required for travelling a distance is divided into the plurality of time periods, and a risk value in a driving mode in each time period is determined based on a traffic context (that is, information related to a traffic environment before a current moment and after the current moment) in the time period such that the risk can be more objectively identified.

The foregoing manner of determining a time period is merely an example for description. The vehicle-end apparatus 410 may alternatively determine a time period using another method, for example, determine, based on a distance and a speed, a time period required for travelling the distance. The time period is the "time period" described in S910. For another example, the first moment and the second moment are determined at the current moment such that the "time period" described in S910 is determined.

In the foregoing embodiment, the risk value in the self-driving mode and/or the manual driving mode can be determined. The self-driving mode includes the shadow driving mode, and evaluating the safety of the self-driving system based on the risk value in the shadow driving mode is an important factor that enables the self-driving safety evaluation method provided in this application to achieve a better technical effect compared with that in the other approaches.

A purpose of the shadow driving mode is to generate a simulated vehicle control track of self-driving using software and hardware that are run in a system background in the manual driving mode, to identify a potential risk of the self-driving system, and accumulate data required by safety evaluation.

To achieve the foregoing objective, a main difficulty is that when the vehicle is in the manual driving mode, a self-driving module cannot really control the vehicle, and how a shadow track approaches an actual risk level of the self-driving system.

The vehicle control track of self-driving directly generated based on sensed data of a sensor cannot represent the real risk level of the self-driving system. Consequently, distortion of a self-driving safety evaluation result is caused.

Figure 10:
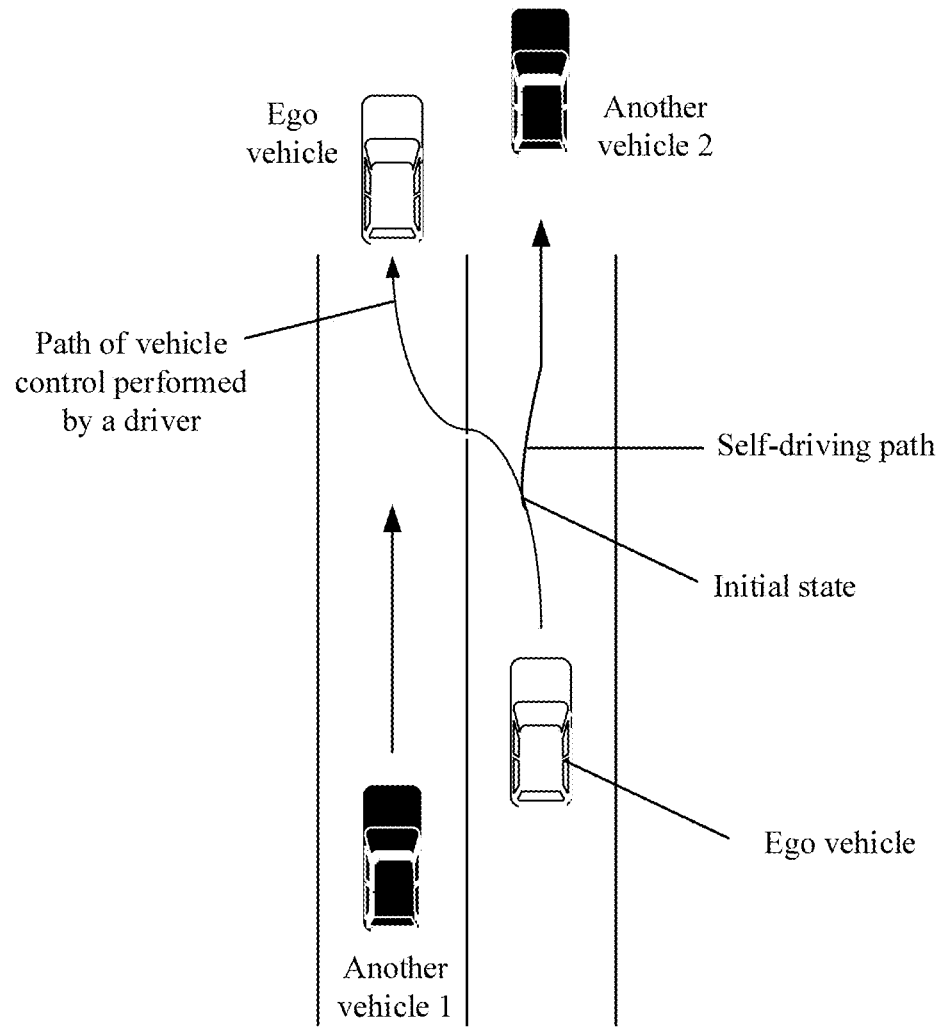
FIG. 10 is a schematic diagram of a vehicle control track of self-driving according to this application.

FIG. 10 is a schematic diagram of a vehicle control track of self-driving. A dashed-line arrow represents an actual track of an ego vehicle in a manual driving mode. A solid-line arrow represents a self-driving track simulated based on sensed data of a sensor. Because the sensed data indicates that there is another vehicle 1 on a left lane, the self-driving system simulates a track used by the ego vehicle to continue to travel along an original lane. Actually, the ego vehicle does not travel along the original lane but changes a lane. The self-driving track simulated based on the sensed data of the sensor cannot reflect a real driving status, causing distortion of a result of self-driving safety evaluation that is based on the track.

The following describes in detail how the shadow driving mode provided in this application resolves the foregoing problem of distortion of the result.

In an optional implementation, before S920, the method 900 further includes the following steps.

Step 8. Determine a location and a movement parameter of the vehicle at a first moment, where the vehicle travels at the first moment based on the manual driving mode.

Step 9. Predict a location of the vehicle at a third moment based on the location and the movement parameter of the vehicle at the first moment, where the third moment is later than the first moment.

Step 10. Predict the shadow driving mode of the vehicle from the location at the first moment to the location at the third moment based on the location at the first moment and the location at the third moment, where the shadow driving mode is a self-driving mode of the vehicle that is predicted based on the location and the movement parameter of the vehicle in the manual driving mode.

S920 includes the following step.

Step 11. Determine, at the current moment, $r_a$, $r_b$, and $r_c$ based on the risk identification manner corresponding to the risk scenario, where $r_a$ is a risk in the manual driving mode in the time period, $r_b$ is a risk in the shadow driving mode in the time period, and $r_c$ is a risk in a self-driving mode based on a preset route in the time period.

The vehicle may predict a location of the vehicle after a future time period based on the location and the movement parameter of the vehicle at the first moment, that is, predict a location of the vehicle at the third moment. The vehicle is in a manual driving status at the first moment, and subsequently, the vehicle predicts the shadow driving mode of the vehicle from the location at the first moment to the location at the third moment. In the foregoing embodiment, a route of self-driving is continuously modified based on the location and the movement parameter in the manual driving mode, to enable the route in the self-driving mode to be closer to a route in the manual driving mode. Therefore, more objective self-driving risk data can be obtained.

The third moment may be the current moment described in S920, or may be the second moment, or may be a moment after the second moment.

Figure 11:
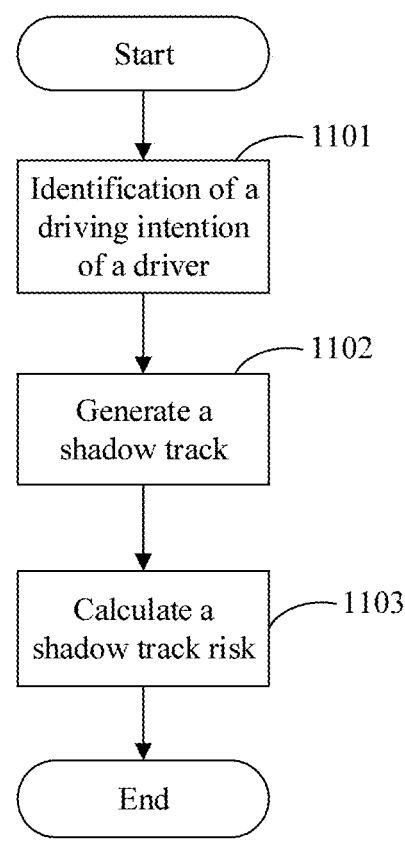
FIG. 11 is a schematic flowchart of a shadow driving mode according to this application.

FIG. 11 is a flowchart of a shadow driving mode according to this application.

When a driver drives an automobile, the shadow driving module 414 identifies, at a first moment, a driving intention of the driver (step 1101) based on a movement parameter (for example, a speed and an acceleration) of the vehicle, that is, the content described in step 8 step 10, and then uses the identified driving intention of the driver as input information of the shadow driving module 414, to generate a shadow track (step 1102) and to calculate a shadown track risk (step 1103), thereby improving a degree of overlap between the shadow track and a track of vehicle control performed by the driver.

The driving intention of the driver includes but is not limited to at least one of travelling along a current lane, turning, and changing a lane.

Figure 12:
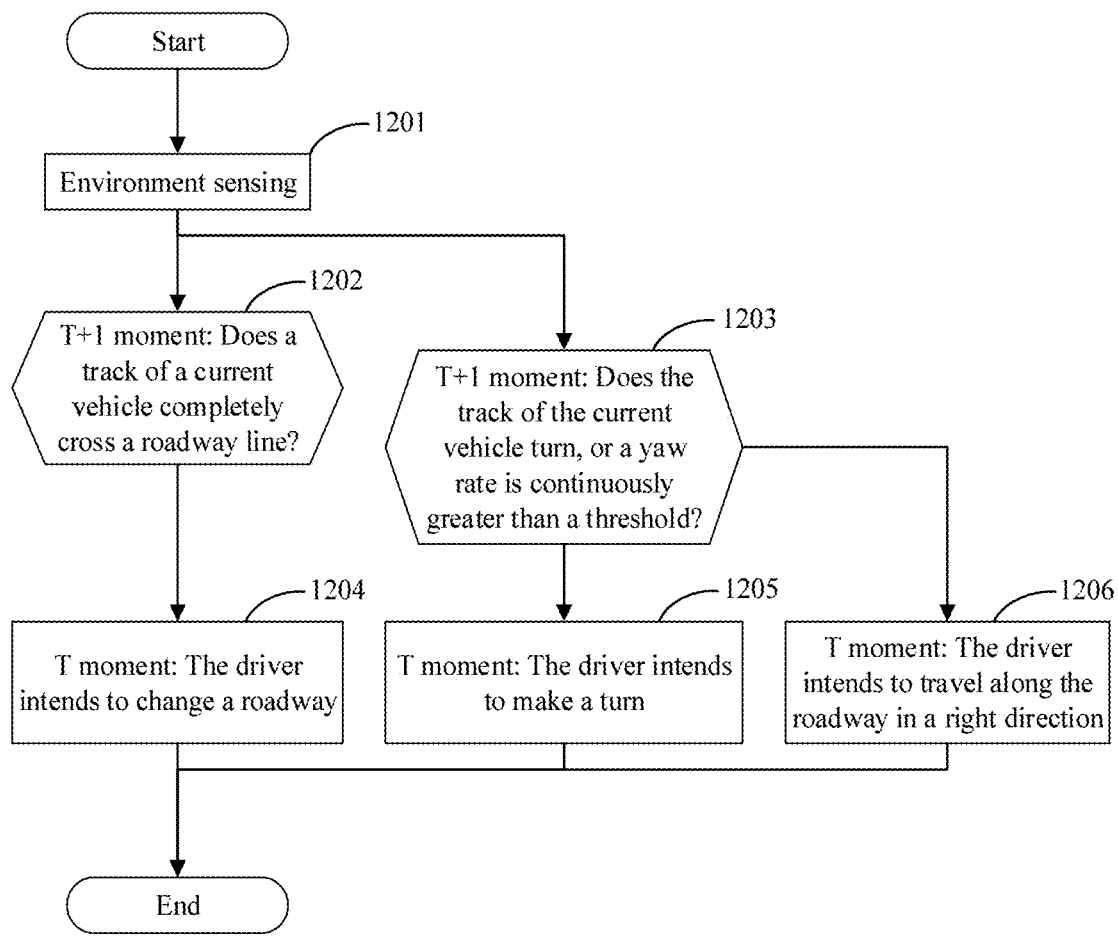
FIG. 12 is a schematic flowchart of a method for identifying a driving intention of a driver according to this application.

FIG. 12 is a flowchart of a method for identifying an intention of a driver according to this application.

The sensor 411 is configured to sense environment information (step 1201). Starting from a moment T (equivalent to a first moment) to a moment T+1 (equivalent to a third moment), if a track of an ego vehicle completely crosses a lane line (step 1202), it is determined that the driving intention of the driver is to change a lane (step 1204).

Starting from the moment T to the moment T+1, if the track of the ego vehicle is a track of completing turning by turning left or turning right in the lane, or if a yaw rate is continuously greater than a yaw rate threshold in a time period before the moment T and adjacent to the moment T (step 1203), it is determined that the driving intention of the driver is turning (step 1205).

Starting from the moment T to the moment T+1, if the track of the ego vehicle does not completely cross the current lane, it is determined that the driving intention of the driver is travelling along the current lane (step 1206), where behaviors such as obstacle avoidance in the lane, enabling a front vehicle to travel first, and following a front vehicle all belong to travelling in the current lane.

In the foregoing embodiment, the information at the future moment is predicted using the current information, and the current driving intention of the driver is determined using the predicted information at the future moment, thereby eliminating a deviation caused by determining the intention of the driver based on sensed data of a sensor.

Figure 13:
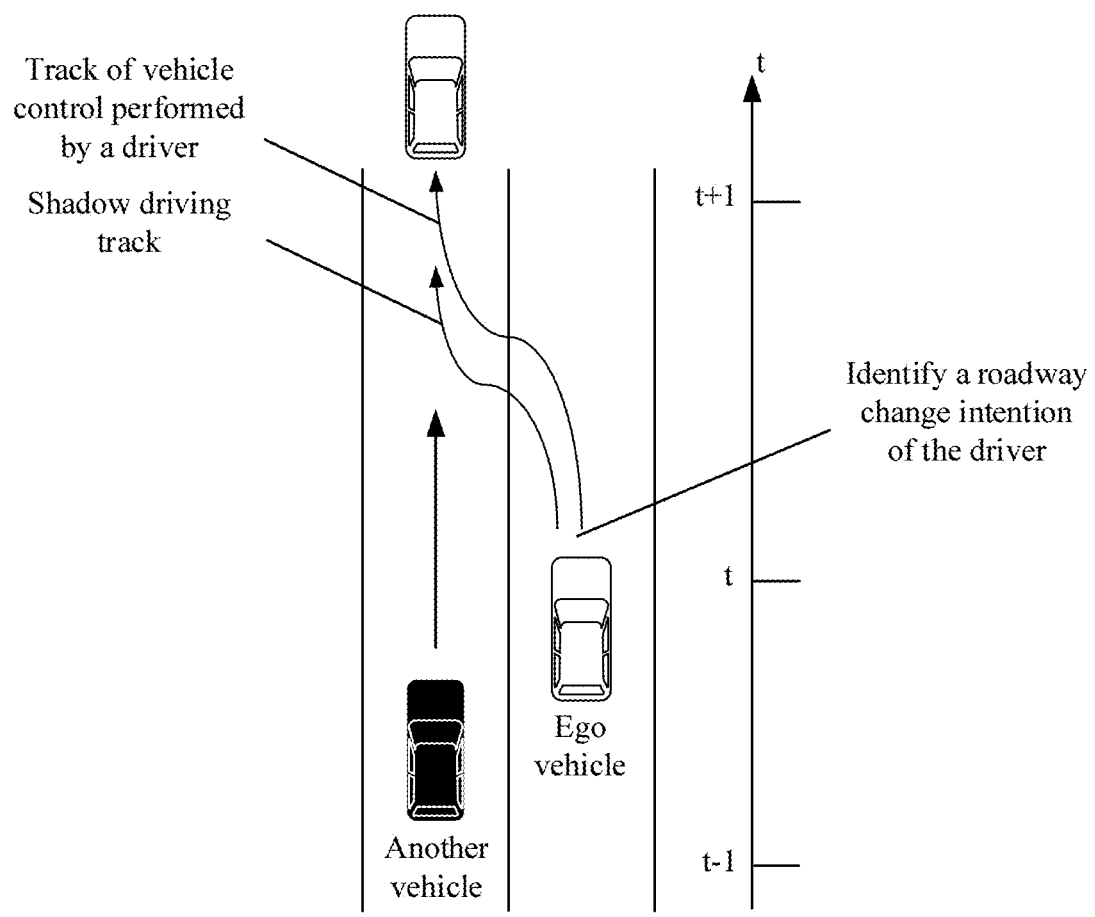
FIG. 13 is a schematic diagram of predicting a shadow track based on a shadow driving mode according to this application.

FIG. 13 is a schematic diagram of predicting a shadow track based on a shadow driving mode according to this application.

The shadow track shown in FIG. 13 is approximately the same as a track of vehicle control performed by a driver, but has a slight difference. Different risk values are respectively obtained based on the track of vehicle control performed by the driver and the shadow track, and which of a manual driving mode and a self-driving mode is safer may be estimated based on a difference between the risk values.

For example, when a driving intention of the driver is a risk intention (for example, aggressive cutting in), if correctly identifying a risk in this case, the shadow driving module 414 generates no shadow track conforming to the driving intention of the driver, but generates a shadow track by selecting a safer decision (for example, keeping travelling in a right direction in a lane). The risk of the shadow track and the risk of an actual vehicle control result are identified such that a scenario of a dangerous intention of the driver can be obtained, and a safer decision (or the contrary) made for the shadow track in this case can be obtained.

Figure 14:
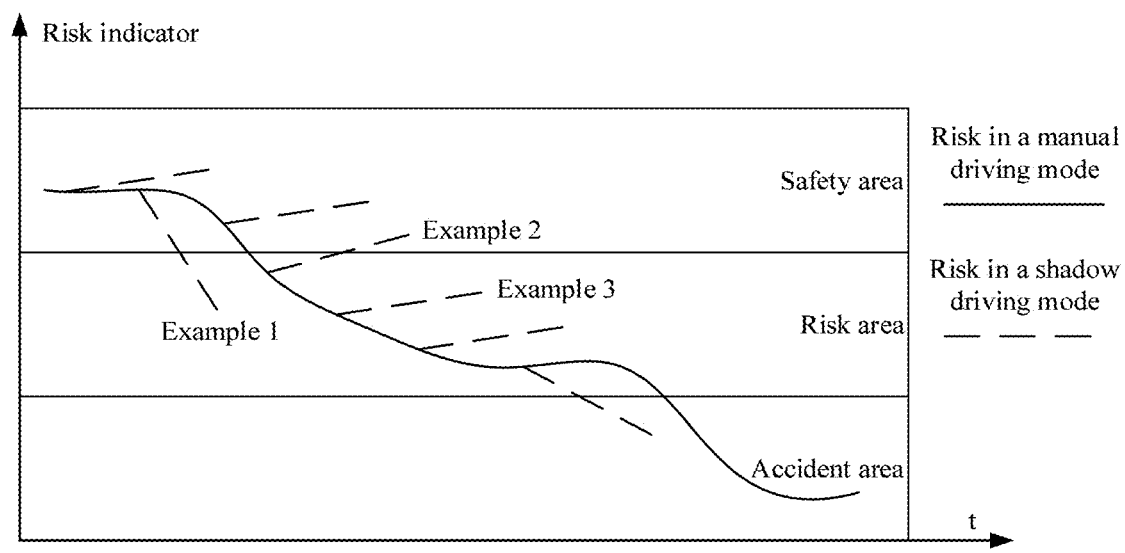
FIG. 14 is a schematic diagram of a comparison between a risk in a shadow driving mode and a risk in a manual driving mode according to this application.

In a relatively short time period, for example, in $3s$, a track of driving performed by the driver is approximately the same as the shadow track, and may be approximately closed-loop control in a self-driving system. In this case, a risk scenario caused by the shadow track is similar to a risk scenario that may be caused when the driver controls a vehicle. FIG. 14 is a schematic diagram of the risk value of the shadow track that is calculated in the step of calculating the risk value of the shadow track shown in FIG. 11.

In FIG. 14, a solid line represents the risk value obtained based on the track of vehicle controlled by the driver that is calculated in step 4 to step 7, and a dashed line is a risk value calculated based on a shadow track corresponding to each time period (for example, a time period from the first moment to the third moment) in step 4 to step. 7.

In example 1, for the track of vehicle control performed by the driver, a risk ($r_a$ is equal to 0) is not generated, and for the shadow track, a new risk ($r_b$ is greater than 0) is generated. Consequently, a risk indicator falls from a safe area ($r=0$) to a risk area ($0<r<1$). Therefore, a potential risk of a self-driving system that causes a risk may be identified, to be specific, an "unknown potential risk" (a diagonal part) shown in an F area in FIG. 2 is identified.

In example 2, the track of vehicle control performed by the driver continuously falls into the risk area, and the shadow track returns from the risk area to the safe area. This indicates that a travelling risk is reduced through simulated controlling of the vehicle performed by the system, and the data may be used as an evidence that safety performance of the self-driving system is higher than that of vehicle control performed by the driver.

In example 3, both the track of vehicle control performed by the driver and the shadow track continuously fall into the risk area, but the risk value of the shadow track is less than that of the track of vehicle control performed by the driver. This indicates that the driving risk is reduced through simulated controlling of the vehicle performed by the self-driving system, and the data may be used as an evidence that safety performance of the self-driving system is higher than that of vehicle control performed by the driver.

All data in the foregoing three examples may be used as data used to perform self-driving safety evaluation in the method 600.

It can be learned from content shown in FIG. 12 to FIG. 14 that, because a shadow track generation method is consistent with an algorithm of vehicle control of self-driving, and a method for calculating a risk of the shadow track is consistent with a method for calculating a risk of a self-driving/driver driving track such that it can be ensured that a shadow track risk represents a self-driving system risk.

When the safety of the self-driving system is evaluated, in an optional implementation, the method 900 further includes the following.

Step 12. Send $r_a$, $r_b$, and $r_c$ to a safety center, where $r_a$, $r_b$, and $r_c$ are used to evaluate safety in the manual driving mode and the shadow driving mode.

The vehicle may send the foregoing risk data to the safety center after obtaining $r_a$, $r_b$, or $r_c$ such that the safety center evaluates the safety in the manual driving mode and the shadow driving mode, thereby reducing an operating load of an in-vehicle processor. The security center is, for example, the cloud apparatus 420.

Evaluating safety of the self-driving automobile in a self-driving mode is a long-term process. Even if evaluation of the safety in the self-driving mode is passed, it does not mean that the self-driving mode is 100% safe. Therefore, it is necessary to design a solution for immediate control of a risk, that is, to reduce or eliminate the risk through the risk control module 416.

Figure 15:
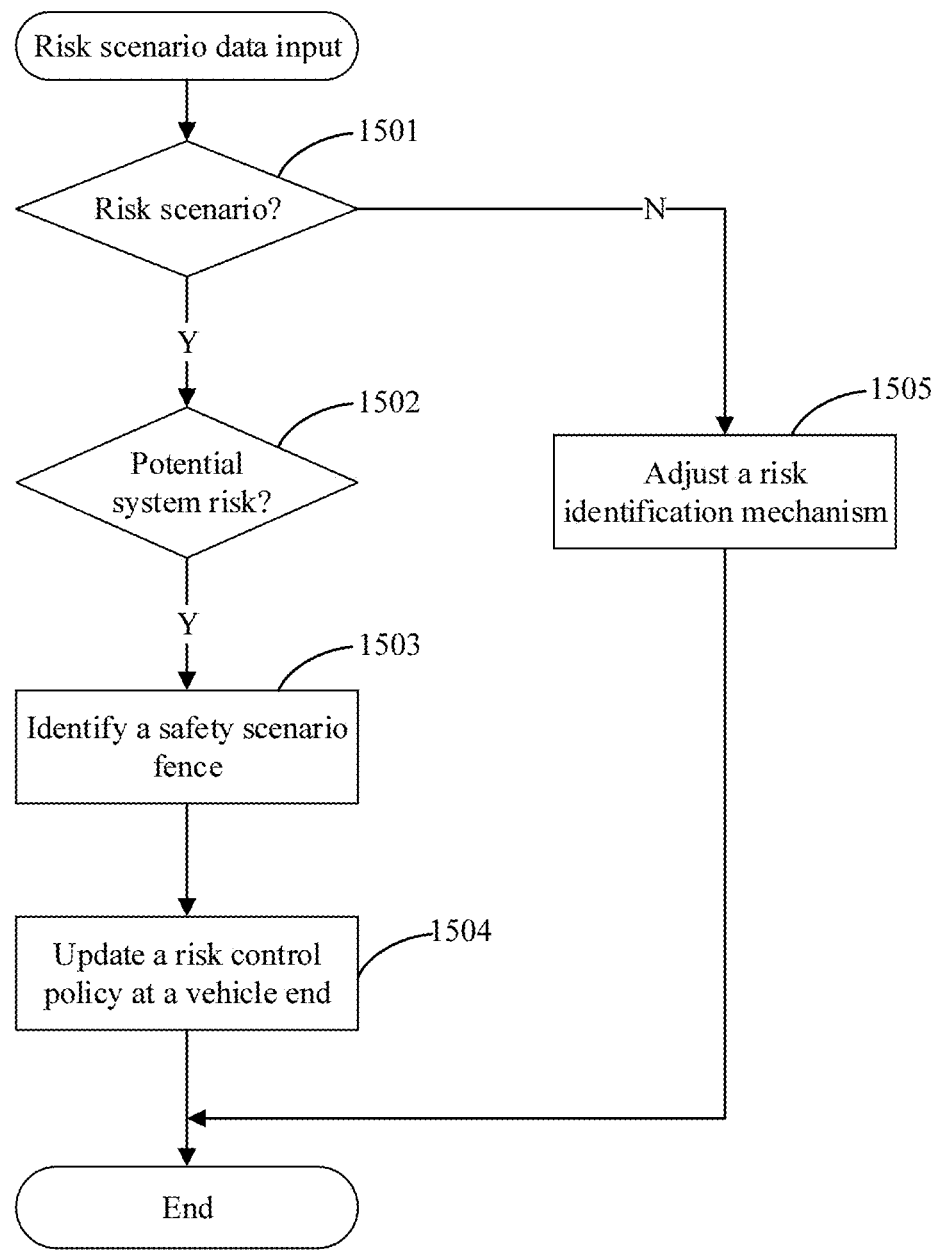
FIG. 15 is a schematic flowchart of a risk control method according to this application.

FIG. 15 is a schematic flowchart of a risk control method according to this application.

As shown in FIG. 15, risk scenario data includes but is not limited to at least one of sensing data obtained by the sensor 411, a track generated by the self-driving module 413, or a track generated by the shadow driving module 414. The risk identification module 415 determines, based on the risk scenario data, whether a current scenario is a risk scenario (step 1051). If the risk identification module 415 determines that the current scenario is a non-risk scenario, but it is found that the current scenario is actually a risk scenario afterwards, a risk identification mechanism may be adjusted (step 1505), for example, a risk identification threshold parameter may be adjusted and a risk identification algorithm may be modified. If the risk identification module 415 confirms that the current scenario is a risk scenario and determines that the risk scenario is caused by a potential risk of a self-driving system (step 1502), the risk identification module 415 reports the risk scenario to the risk policy module 421. The risk policy module 421 sends policy update information to the risk control module 416, updates the risk control policy (step 1504) of the vehicle-end apparatus 410, and excludes the risk scenario from the safe scenario fence (step 1503).

In an optional embodiment, the method 900 further includes the following steps.

Step 13. Receive safety scenario information sent by the safety center, where the safety scenario information is used to indicate a safe driving traffic scenario set in a self-driving mode.

Step 14. Determine the safe driving traffic scenario set in the self-driving mode based on the safety scenario information.

Step 15. If the current traffic scenario does not belong to the safe driving traffic scenario set, the vehicle plays and/or displays prompt information prompting the driver to perform manual driving, and/or the vehicle performs safe stopping processing.

The safety center may identify a risk scenario based on the risk data reported by the vehicle, and update a risk identification mechanism and a risk control policy of the vehicle by sending the safety scenario information to the vehicle.

For example, if a risk is caused by a potential risk of the self-driving system, the safety scenario information may instruct the vehicle to exclude the risk scenario from the safe driving traffic scenario set. The vehicle updates the safe driving traffic scenario set after receiving the safety scenario information. If the current traffic scenario does not belong to the updated safe driving traffic scenario set, the vehicle takes safety measures, for example, plays and/or displays prompt information prompting the driver to perform manual driving, and/or performs safe stopping processing.

The safe driving traffic scenario set may also be referred to as a safe driving scenario fence, and includes an environment, a static scenario, a dynamic scenario, and a behavior of an ego vehicle. In a technical solution, a definition of the scenario fence is shown in FIG. 16.

Figure 16:
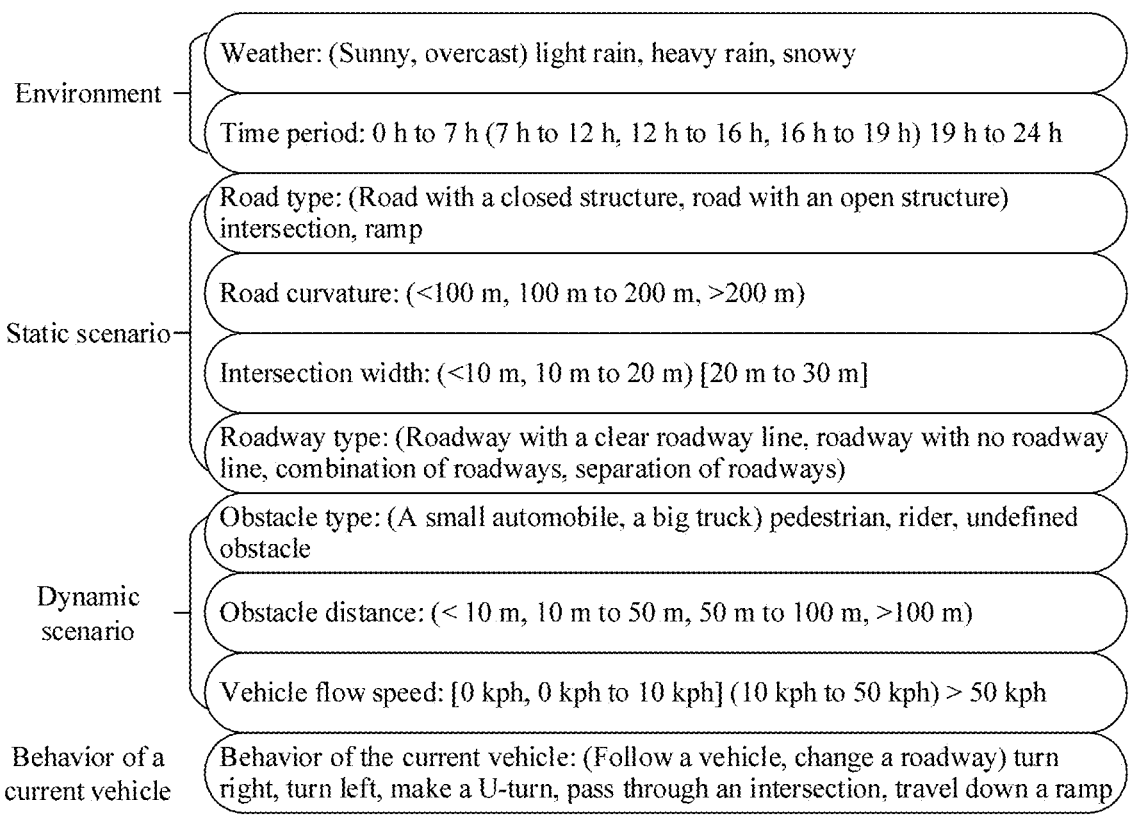
FIG. 16 is a schematic diagram of a safe driving scenario fence according to this application.

In FIG. 16, content in round brackets is content included in a safe driving scenario fence of a self-driving system. The cloud apparatus 420 transmits safety scenario information based on an identified potential risk of the self-driving system in a timely manner, to update content in the safe driving scenario fence. In the vehicle-end apparatus 410, the risk control module 416 obtains an identified result of each element of the scenario fence based on map input and a real-time sensing result, and updates content in the safe driving scenario fence based on the safety scenario information sent by the cloud apparatus 420. In a process of controlling, by the self-driving module 413, a vehicle to travel, if the risk control module 416 determines that a current scenario exceeds a safe driving scenario fence range, the self-driving module 413 prompts a driver to take over the vehicle, or controls the vehicle to stop in a safe zone.

In an example (content in square brackets) shown in FIG. 16, a risk event is that a potential risk is caused due to that the system cannot accurately identify a type of a red and green light because of an intersection width greater than 20 m. In this case, in an updated safe driving scenario fence, the intersection width is less than 20 m. When the vehicle travels again to an intersection with a width greater than or equal to 20 m, the self-driving system takes a conservative control policy (for example, prompts the driver or pulls over the vehicle).

In another example (content in square brackets) shown in FIG. 16, a risk event is that a potential risk is caused due to that the self-driving system cannot measure a speed of a low-speed vehicle in time. In this case, in an updated safe driving scenario fence, an applicable vehicle flow speed in a dynamic scenario is from 10 to 50 km/h. When detecting that the ego vehicle flow speed is less than 10 kph, the self-driving system prompts the driver to take over the vehicle, or gently pulls over the vehicle.

In addition, a driver in-the-loop policy may alternatively be adjusted, for example, an alerting interval may be adjusted.

The foregoing describes in detail examples of the method for evaluating self-driving safety and the method for determining the driving risk of a vehicle that are provided in this application. It may be understood that, to implement the foregoing functions, the vehicle-end apparatus and the cloud apparatus include corresponding hardware structures and/or software modules for performing the functions. A person of ordinary skill in the art should be easily aware that, in combination with the examples described in the embodiments disclosed in this specification, units and algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, function unit division may be performed on the vehicle-end apparatus and the cloud apparatus based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in this application, unit division is an example, and is merely a logical function division. In actual implementation, another division manner may be used.

Figure 17:
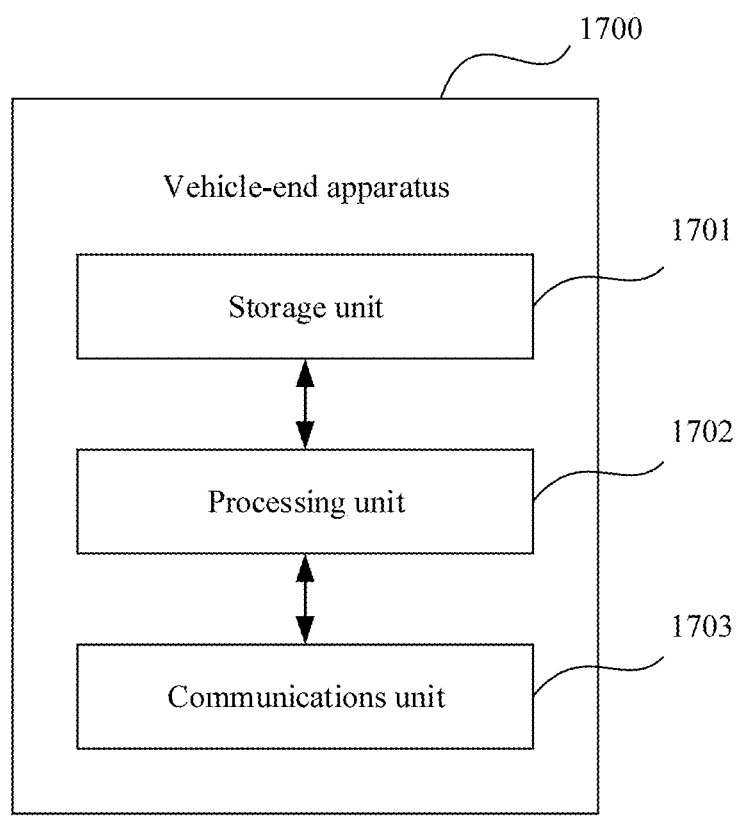
FIG. 17 is a schematic diagram of a vehicle-end apparatus according to this application.

If an integrated unit is used, FIG. 17 is a possible schematic structural diagram of the vehicle-end apparatus 1700 in the foregoing embodiments. The vehicle-end apparatus 1700 includes a processing unit 1702 and a communications unit 1703. The processing unit 1702 is configured to control and manage an action of the vehicle-end apparatus 1700. For example, the processing unit 1702 is configured to support the vehicle-end apparatus 1700 in performing S620 and/or another process used for the technology described in this specification. The communications unit 1703 is configured to support communication between the vehicle-end apparatus 1700 and a cloud apparatus. The vehicle-end apparatus 1700 may further include a storage unit 1701 configured to store program code and data of the vehicle-end apparatus 1700.

In an optional embodiment, the processing unit 1702 is configured to perform S610 to S630. When the processing unit 1702 performs S610, the processing unit 1702 may also be referred to as an obtaining unit 1702. The storage unit 1701 needs to store intermediate data generated in a process in which the processing unit 1702 performs the foregoing steps. For example, the intermediate data is $r_b$ and $r_c$ such that the processing unit 1702 determines, based on a risk value in a shadow driving mode in a plurality of measurement units and a risk value in a self-driving mode based on a preset route, whether safety of a vehicle in the self-driving mode meets a requirement.

In another optional embodiment, the processing unit 1702 is configured to perform S610, and control the communications unit 1703 to send $r_b$ and $r_c$ to the cloud apparatus such that the cloud apparatus performs S620 and S630.

In a third optional embodiment, the processing unit 1702 is configured to control the communications unit 1703 to send, to a cloud apparatus, original data (for example, sensor data) used for calculating $r_b$ and $r_c$ such that the cloud apparatus performs S610 to S630.

In a fourth optional embodiment, the processing unit 1702 is configured to perform S910 and S920. Optionally, the processing unit 1702 is configured to control the communications unit 1703 to perform step 12.

The processing unit 1702 may be a processor or a controller, for example, may be a central processing unit (CPU), a general-purpose processor, a digital signal processor (DSP), an application-specific integrated circuit (ASIC), a field-programmable gate array (FPGA), or another programmable logical device, a transistor logical device, a hardware component, or a combination thereof. The processor may implement or execute various example logical blocks, modules, and circuits described with reference to content disclosed in this application. Alternatively, the processor may be a combination for implementing a computing function, for example, a combination of one or more microprocessors, or a combination of the DSP and a microprocessor. The communications unit 1703 may be a transceiver or the like. The storage unit 1701 may be a memory.

Figure 18:
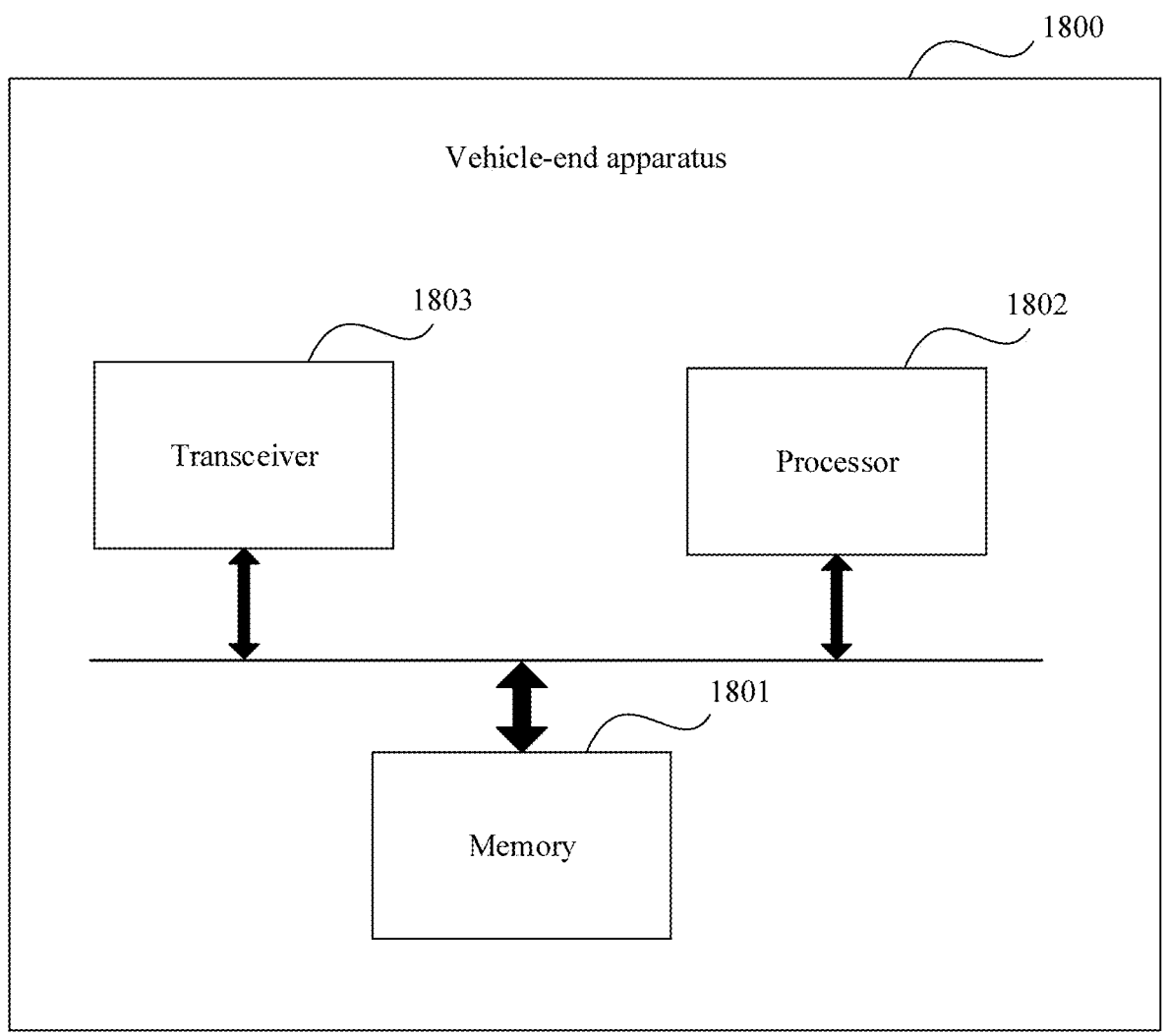
FIG. 18 is a schematic diagram of another vehicle-end apparatus according to this application.

When the processing unit 1702 is a processor, the communications unit 1703 is a transceiver, and the storage unit 1701 is a memory, the vehicle-end apparatus in this application may be a vehicle-end apparatus 1800 shown in FIG. 18.

As shown in FIG. 18, the vehicle-end apparatus 1800 includes a processor 1802, a transceiver 1803, and a memory 1801. The transceiver 1803, the processor 1802, and the memory 1801 may communicate with each other through an internal connection path, and transmit a control signal and/or a data signal.

It may be clearly understood by a person skilled in the art that, for ease and brief description, for a detailed working process of the foregoing apparatus and units, refer to a corresponding process in the foregoing method embodiments, and details are not described herein again.

Figure 19:
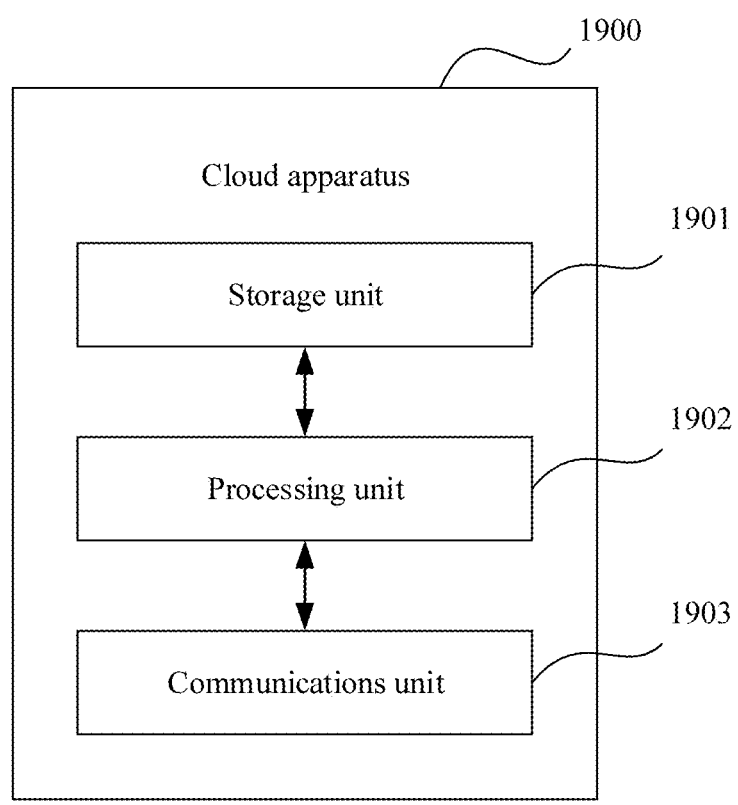
FIG. 19 is a schematic diagram of a cloud apparatus according to this application.

In a case that an integrated unit is used, FIG. 19 is a possible schematic structural diagram of the cloud apparatus 1900 described in the foregoing embodiments. The cloud apparatus 1900 includes a processing unit 1902 and a communications unit 1903. The processing unit 1902 is configured to control and manage an action of the cloud apparatus 1900. For example, the processing unit 1902 is configured to support the cloud apparatus 1900 in performing S620 and/or another process used for the technology described in this specification. The communications unit 1903 is configured to support communication between the cloud apparatus 1900 and a vehicle-end apparatus. The cloud apparatus 1900 may further include a storage unit 1901 configured to store program code and data of the cloud apparatus 1900.

In an optional embodiment, the processing unit 1902 is configured to control the communications unit 1903 to perform S610, that is, receive $r_b$ and $r_c$ from the vehicle-end apparatus. In this case, the communications unit 1903 may also be referred to as an obtaining unit 1903, and the processing unit 1902 is further configured to perform S620 to step 2. The storage unit 1901 needs to store intermediate data generated in a process in which the processing unit 1902 performs the foregoing steps. For example, the intermediate data is $r_b$ and $r_c$ such that the processing unit 1902 determines, based on a risk value in a shadow driving mode in a plurality of measurement units and a risk value in a self-driving mode based on a preset route, whether safety of a vehicle in the self-driving mode meets a requirement.

In another optional embodiment, the processing unit 1902 is configured to control the communications unit 1903 to receive, from the vehicle-end apparatus, original data (for example, sensor data) used for calculating $r_b$ and $r_c$. The processing unit 1902 is further configured to obtain $r_b$ and $r_c$ based on the original data received by the communications unit 1903. In this case, the processing unit 1902 may also be referred to as an obtaining unit 1902. The processing unit 1902 is further configured to perform S620 to step 2. The storage unit 1901 needs to store intermediate data generated in a process in which the processing unit 1902 performs the foregoing steps. For example, the intermediate data is $r_b$ and $r_c$ such that the processing unit 1902 determines, based on a risk value in a shadow driving mode in a plurality of measurement units and a risk value in a self-driving mode based on a preset route, whether safety of a vehicle in the self-driving mode meets a requirement.

In the third optional embodiment, the processing unit 1902 is configured to perform S910 and S920. Optionally, the processing unit 1902 is configured to control the communications unit 1903 to perform step 12.

The processing unit 1902 may be a processor or a controller, for example, may be a CPU, a general-purpose processor, a DSP, an ASIC, an FPGA, or another programmable logic device, a transistor logic device, a hardware component, or any combination thereof. The processor may implement or execute various example logical blocks, modules, and circuits described with reference to content disclosed in this application. Alternatively, the processor may be a combination for implementing a computing function, for example, a combination of one or more microprocessors, or a combination of the DSP and a microprocessor. The communications unit 1903 may be a transceiver or the like. The storage unit 1901 may be a memory.

Figure 20:
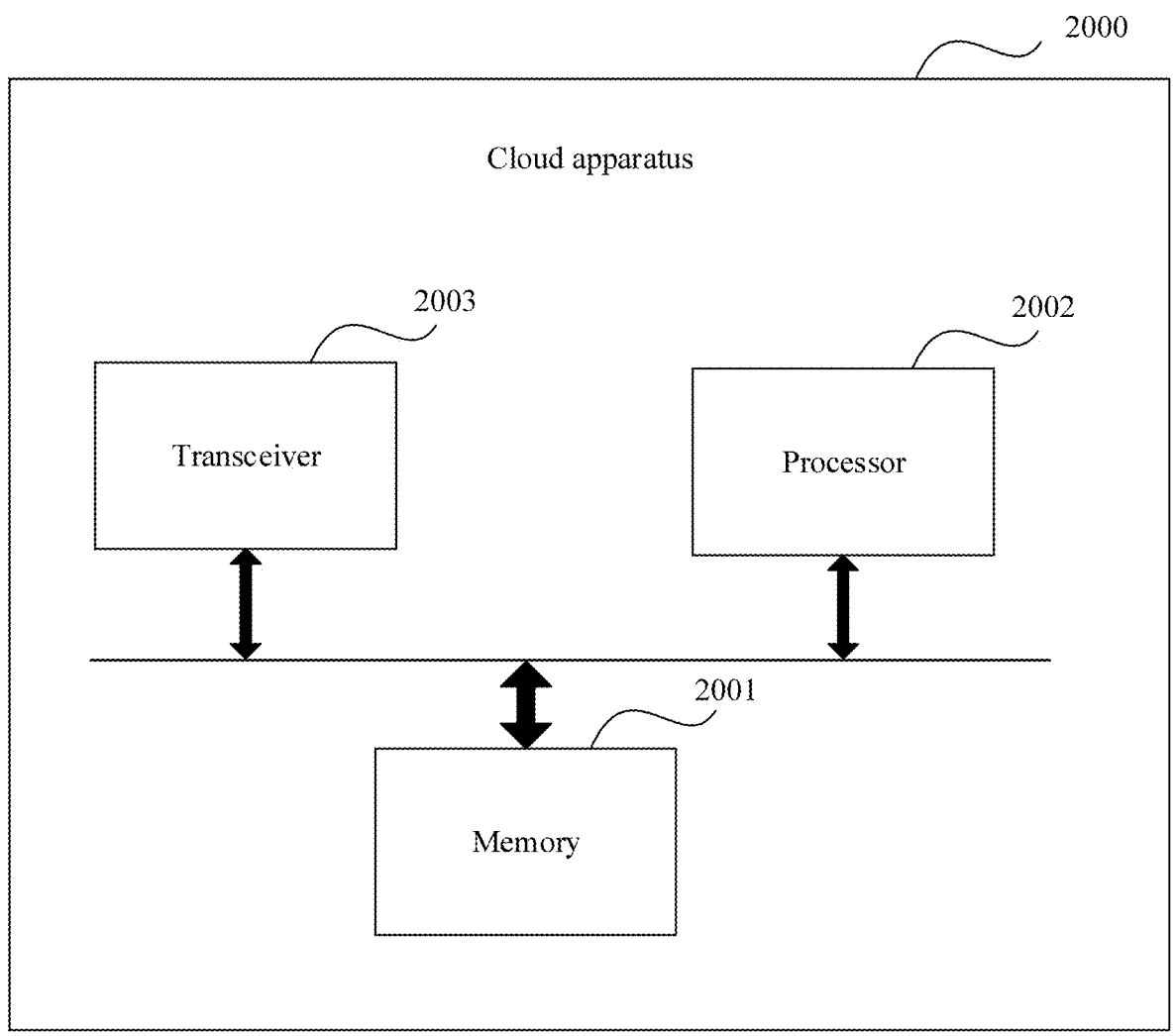
FIG. 20 is a schematic diagram of another cloud apparatus according to this application.

When the processing unit 1902 is a processor, the communications unit 1903 is a transceiver, and the storage unit 1901 is a memory, the cloud apparatus in this application may be a cloud apparatus 2000 shown in FIG. 20.

As shown in FIG. 20, the cloud apparatus 2000 includes a processor 2002, a transceiver 2003, and a memory 2001. The transceiver 2003, the processor 2002, and the memory 2001 may communicate with each other through an internal connection path, and transmit a control signal and/or a data signal.

It may be clearly understood by a person skilled in the art that, for ease and brief description, for a detailed working process of the foregoing apparatus and units, refer to a corresponding process in the foregoing method embodiments, and details are not described herein again.

This application further provides a self-driving safety evaluation system, including the foregoing one or more vehicle-end apparatuses and one or more cloud apparatuses.

It should be understood that the processor in this embodiment of this application may be an integrated circuit chip, and has a signal processing capability. In an implementation process, steps in the foregoing method embodiments can be implemented using a hardware integrated logical circuit in the processor, or using instructions in a form of software. The foregoing processor may be a general-purpose processor, a DSP, an ASIC, an FPGA or another programmable logical device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps in the methods disclosed with reference to the embodiments of this application may be directly executed and accomplished using a hardware decoding processor, or may be executed and accomplished using a combination of hardware and software modules in the decoding processor. The software module may be located in a mature storage medium in the art, such as a random-access memory (RAM), a flash memory, a read-only memory (ROM), a programmable ROM (PROM), an electrically erasable PROM (EEPROM), or a register. The storage medium is located in the memory, and the processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a ROM, a PROM, an erasable PROM (EPROM), an EEPROM, or a flash memory. The volatile memory may be a RAM, used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchronous link DRAM (SLDRAM), and a direct rambus (DR) RAM. It should be noted that the memory of the systems and methods described in this specification is intended to include but is not limited to these and any memory of another appropriate type.

This application further provides a computer readable medium. The computer readable medium stores a computer program. When being executed by a computer, the computer program implements the function of any one of the foregoing method embodiments.

This application further provides a computer program product. When being executed by a computer, the computer program product implements the function of any one of the foregoing method embodiments.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a FLOPPY DISK, a hard disk, or a magnetic tape), an optical medium (for example, a high density digital versatile disc (DVD), a semiconductor medium (for example, a solid-state drive (SSD)), or the like.

This application further provides a processing apparatus, including a processor and an interface. The processor is configured to perform the steps described in any one of the foregoing method embodiments.

It should be understood that the processing apparatus may be a chip, and the processor may be implemented by hardware, or may be implemented by software. When implemented by hardware, the processor may be a logic circuit, an integrated circuit, or the like. When implemented by software, the processor may be a general-purpose processor, and is implemented by reading software code stored in a memory. The memory may be integrated in the processor, or may exist independently outside the processor.

It should be understood that "embodiment" mentioned in the entire specification means that particular characteristics, structures, or features related to the embodiments are included in at least one embodiment of this application.

Therefore, the embodiments in the entire specification do not necessarily refer to a same embodiment. In addition, these particular characteristics, structures, or features may be combined in one or more embodiments using any appropriate manner. It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined only according to A, that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation. The computer-readable medium may include a RAM, a ROM, an EEPROM, a compact disc ROM (CD-ROM) or another optical disc storage, a disk storage medium or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a DSL, or wireless technologies such as infrared ray, radio, and microwave, the coaxial cable, optical fiber/cable, twisted pair, DSL, or wireless technologies such as infrared ray, radio, and microwave are included in fixation of a medium to which they belong. A disk and disc used by this application include a compact disc (CD), a laser disc, an optical disc, a DVD, a FLOPPY DISK, and a BLU-RAY DISC, where the disk generally copies data magnetically, and the disc copies data optically using laser. The foregoing combination should also be included in the protection scope of the computer-readable medium.

In conclusion, what is described above is merely embodiments of the technical solutions of this application, but is not intended to limit the protection scope of this application. Any modification, equivalent replacement, or improvement made without departing from the spirit and principle of this application shall fall within the protection scope of this application.

What is claimed is:

1. A self-driving safety evaluation method comprising:
collecting, using a sensor mounted to a vehicle, environment data, wherein the vehicle further comprises a processor and a communications interface;
obtaining, using the processor and based on the environment data, $r_b$ and $r_c$, wherein $r_b$ is a first risk value of a vehicle in a shadow driving mode in a first measurement unit, wherein $r_c$ is a second risk value of the vehicle in a self-driving mode based on a preset route in the first measurement unit, wherein the shadow driving mode is a self-driving mode of the vehicle based on a real-time route, wherein the real-time route is predicted and continuously modified based on a location and a movement parameter of the vehicle in a manual driving mode, and wherein the first measurement unit is a time period or a distance;

determining, using the processor, $R_B$ based on $r_b$, wherein $R_B$ is a third risk value of the vehicle in the shadow driving mode in a plurality of measurement units, and wherein the measurement units comprise the first measurement unit;

determining, using the processor, $R_C$ based on $r_c$, wherein $R_C$ is a fourth risk value of the vehicle in the self-driving mode based on the preset route in the measurement units, and wherein $R_B$ and $R_C$ are used to determine whether a safety of the vehicle on a self-driving route meets a requirement, wherein the requirement comprises the sum of $R_B$ and $R_C$ is less than or equal to a self-driving risk threshold, wherein the self-driving risk threshold is $a(R_A+R'_A)$, wherein a is a risk tolerance coefficient, wherein $R_A$ is a fifth risk value of the vehicle in the manual driving mode in the measurement units, wherein a road section through which the vehicle passes in the measurement units is a first road section, and wherein $R'_A$ is a sixth risk value of the vehicle passing through the first road section outside the measurement units based on the manual driving mode;

calculating, using the processor, a sum of $R_B$ and $R_C$;

sending, to a cloud device coupled to the communication interface, the sum of $R_B$ and $R_C$ to determine whether the safety of the vehicle on the self-driving route meet the requirement; and controlling, by the processor, the vehicle to travel in the self-driving route when determining the safety of the vehicle on the self-driving route meet the requirement.

2. The self-driving safety evaluation method of claim 1, further comprising determining $R_B$ or $R_C$ based on $R_i = (\Sigma_{event} s_{event} \times r_i)/X$, wherein event represents a risk scenario, wherein $s_{event}$ represents a coefficient of a severity degree of an accident in the risk scenario, wherein X represents the measurement units, wherein $R_i$ represents $R_B$ when $r_i$ represents $r_b$, and wherein $R_i$ represents $R_C$ when $r_i$ represents $r_c$.

3. The self-driving safety evaluation method of claim 2, wherein when the risk scenario is a collision scenario, the self-driving safety evaluation method further comprises determining $r_b$ and $r_c$ based on at least one of the following parameters:

a speed ($\Delta v$) of the vehicle relative to a collision object, wherein $\Delta v$ is positively correlated to $r_b$ or $r_c$;

a time-to-collision (TTC) between the vehicle and the collision object based on a movement track of the collision object, wherein the TTC is negatively correlated to $r_b$ or $r_c$;

a time-to-headway (THW) of the vehicle based on a distance between the vehicle and the collision object, wherein the THW is negatively correlated to $r_b$ or $r_c$; or the distance between the vehicle and the collision object, wherein the distance between the vehicle and the collision object is negatively correlated to $r_b$ or $r_c$.

4. The self-driving safety evaluation method of claim 3, further comprising determining $r_b$ and $r_c$ based on $r_{SG1} = f(t)_{max}$, wherein $r_{SG1}$ is $r_b$ or $r_c$ in the collision scenario, wherein $t \in \{t_{event}, h(t_{event}, obj)=1\}$, wherein $f(t) = \Delta v(t) * \exp(-\min\{r_0 TTC(t), r_1 THW(t), r_2 s\})$, wherein $\{t_{event}, h(t_{event}, obj)=1\}$ represents a time period in which a collision risk occurs, wherein TTC(t) represents a TTC at a t moment, wherein THW(t) represents a THW at the t moment, wherein each of $r_0$, $r_1$, and $r_2$ is a normalized parameter, wherein v is a speed of the vehicle at the t moment, wherein $\Delta v(t)$ is $\Delta v$ at the t moment, wherein exp is an exponent comprising a base of a natural constant, and wherein s represents the distance between the vehicle and the collision object.

5. The self-driving safety evaluation method of claim 2, wherein when the risk scenario is a traffic signal light scenario, the self-driving safety evaluation method further comprises determining $r_b$ and $r_c$ based on a speed of the vehicle and a distance from the vehicle to a traffic signal light, wherein the speed of the vehicle is positively correlated to $r_b$ or $r_c$, and wherein the distance from the vehicle to the traffic signal light is negatively correlated to $r_b$ or $r_c$.

6. The self-driving safety evaluation method of claim 5, further comprising:

determining $r_b$ and $r_c$ based on $r_{SG2} = f(t)_{max}$, wherein $r_{SG2}$ is $r_b$ or $r_c$ in the traffic signal light scenario, wherein $t \in \{t_{event}, h(t_{event}, Light)=1\}$, wherein f(t) is as follows:

$$f(t) = \begin{cases} 1, & \text{when } v(t)^2 \geq 2 \, g \, s(t) \\ \frac{r_3 v(t)^2}{g \, s(t)}, & \text{when } 0.8 \, g \, s(t) \leq v(t)^2 \leq 2 \, g \, s(t), \\ 0, & \text{when } v(t)^2 \leq 0.8 \, g \, s(t) \end{cases}$$

wherein $r_3$ is a normalized parameter, wherein $\{t_{event}, h(t_{event}, Light)=1\}$ represents a time period in which a risk of violating a traffic signal light rule occurs, wherein v(t) represents a speed of the vehicle at a t moment, wherein g is a gravitational acceleration constant, and wherein s(t) represents a distance from the vehicle to the traffic signal light at the t moment.

7. The self-driving safety evaluation method of claim 2, further comprising determining $r_b$ and $r_c$ based on an estimated time taken by the vehicle to rush out of a lane, and wherein the estimated time taken by the vehicle to rush out of the lane is negatively correlated to $r_b$ or $r_c$.

8. The self-driving safety evaluation method of claim 7, further comprising determining $r_b$ and $r_c$ based on $r_{SG3}$, wherein $r_{SG3}$ is as follows:

$$r_{SG3} = \begin{cases} e^{-r_4 t_{lc}}, & \text{when } t_{lc} < TLC_{threshold} \\ 0, & \text{when } t_{lc} \geq TLC_{threshold} \end{cases},$$

wherein $r_{SG3}$ is $r_b$ or $r_c$ in the scenario in which the vehicle rushes out of the road boundary, wherein $TLC_{threshold}$ represents a critical value of the time required by the vehicle to rush out of a road, wherein $$t_{lc} = \frac{\left(y \pm \frac{W_{road}}{2}\right)}{(v_{long}(\phi - \phi_d) + v_{lat})},$$

wherein e is a natural constant, wherein $t_{lc}$ is the estimated time taken by the vehicle to rush out of the lane, wherein y is a lateral offset of the vehicle at the road boundary, wherein $W_{road}$ is a width of the road, wherein $v_{long}$ is a longitudinal speed of the vehicle, wherein $v_{lat}$ is a lateral speed of the vehicle, wherein $\phi - \phi_d$ represents an angle between a heading direction of the vehicle and a road tangent direction, and wherein $r_4$ is a normalized parameter.

9. The self-driving safety evaluation method of claim 2, further comprising determining $r_b$ and $r_c$ based on at least one of the following parameters:

a longitudinal acceleration of the vehicle, wherein the longitudinal acceleration of the vehicle is positively correlated to $r_b$ or $r_c$;

a lateral acceleration of the vehicle, wherein the lateral acceleration of the vehicle is positively correlated to $r_b$ or $r_c$; or a speed of the vehicle, wherein the speed of the vehicle is positively correlated to $r_b$ or $r_c$.

10. The self-driving safety evaluation method of claim 9, further comprising determining $r_b$ and $r_c$ based on $r_{SG4}=r_5$, wherein $r_{SG4}$ is $r_b$ or $r_c$, wherein $(|a_{long}|>a_{threshold1})\|(|a_{lat}|>a_{threshold2})\|(v \geq v_{safe})$, wherein $a_{long}$ represents the longitudinal acceleration of the vehicle, wherein $a_{lat}$ represents the lateral acceleration of the vehicle, wherein $a_{threshold1}$ represents a threshold of the lateral acceleration in a safe driving status, wherein $a_{threshold2}$ represents a threshold of the longitudinal acceleration in the safe driving status, wherein v represents the speed of the vehicle, wherein $v_{safe}$ represents a speed threshold in the safe driving status, and wherein $r_5$ is a normalized parameter.

11. A method for determining a vehicle driving risk comprising:

determining a driving mode and a risk scenario of a vehicle in a time period, wherein a start point of the time period is a first moment, wherein an end point of the time period is a second moment, and wherein the driving mode comprises at least one of a self-driving mode or a manual driving mode;

determining a first location and a movement parameter of the vehicle at the first moment when the vehicle is traveling in the manual driving mode;

predicting a second location of the vehicle at a third moment based on the first location and the movement parameter, wherein the third moment is later than the first moment;

predicting a shadow driving mode of the vehicle from the first location to the second location based on the first location and the second location, wherein the shadow driving mode is another self-driving mode of the vehicle that is predicted and continuously modified based on the first location and the movement parameter of the vehicle in the manual driving mode;

determining, at a current moment, a risk value in the driving mode in the time period based on a risk identification manner corresponding to the risk scenario, wherein the current moment is after the first moment and before the second moment;

determining, at the current moment, $r_a$, $r_b$, and $r_c$ based on the risk identification manner corresponding to the risk scenario, wherein $r_a$ is a first risk value in the manual driving mode in the time period, wherein $r_b$ is a second risk value in the shadow driving mode in the time period, and wherein $r_c$ is a third risk value in the self-driving mode based on a preset route in the time period, wherein $r_a$, $r_b$, and $r_c$ are determined based on $r_{SG1}=f(t)_{max}$, wherein $r_{SG1}$ is $r_a$, $r_b$, or $r_c$ in the collision scenario, wherein $t \in \{t_{event}, h(t_{event}, obj)=1\}$, wherein $f(t)=\Delta v(t)*\exp(-\min\{r_0 TTC(t), r_1 THW(t), r_2 s\})$, wherein $\{t_{event}, h(t_{event}, obj)=1\}$ represents a time period in which a collision risk occurs, wherein TTC(t) represents a TTC at a t moment, wherein THW(t) represents a THW at the t moment, wherein each of $r_0$, $r_1$, and $r_2$ is a normalized parameter, wherein v is a speed of the vehicle at the t moment, wherein $\Delta v(t)$ is $\Delta v$ at the t moment, wherein exp is an exponent comprising a base of a natural constant, and wherein s represents the distance between the vehicle and the collision object; and controlling the vehicle to travel in the driving mode after determining $r_a$, $r_b$, and $r_c$.

12. A self-driving safety evaluation apparatus comprising:

a memory configured to store program instructions; and a processor coupled to the memory, wherein the program instructions cause the processor to be configured to:

obtain, based on environment data sensed by a sensor mounted on a vehicle, $r_b$ and $r_c$, wherein $r_b$ is a first risk value of the vehicle in a shadow driving mode in a first measurement unit, wherein $r_c$ is a second risk value of the vehicle in a self-driving mode based on a preset route in the first measurement unit, wherein the shadow driving mode is a self-driving mode of the vehicle based on a real-time route, wherein the real-time route is predicted and continuously modified based on a location and a movement parameter of the vehicle in a manual driving mode, and wherein the first measurement unit is a time period or a distance;

determine $R_B$ based on $r_b$, wherein $R_B$ is a third risk value of the vehicle in the shadow driving mode in a plurality of measurement units, and wherein the measurement units comprise the first measurement unit;

determine $R_C$ based on $r_c$, wherein $R_C$ is a fourth risk value of the vehicle in the self-driving mode based on the preset route in the measurement units, and wherein $R_B$ and $R_C$ are used to determine whether a safety of the vehicle in a self-driving route meets a requirement, wherein the requirement comprises the sum of $R_B$ and $R_C$ is less than or equal to a self-driving risk threshold, wherein the self-driving risk threshold is $a(R_A+R'_A)$, wherein a is a risk tolerance coefficient, wherein $R_A$ is a fifth risk value of the vehicle in the manual driving mode in the measurement units, wherein a road section through which the vehicle passes in the measurement units is a first road section, and wherein $R'_A$ is a sixth risk value of the vehicle passing through the first road section outside the measurement units based on the manual driving mode;

calculate a sum of $R_B$ and $R_C$;

send, to a cloud device coupled to the processor via a communication interface, the sum of $R_B$ and $R_C$ to determine whether that the safety of the vehicle on the self-driving route meet the requirement; and control the vehicle to travel on the self-driving route when determining the safety of the vehicle on the self-driving route meet the requirement.

13. The self-driving safety evaluation apparatus of claim 12, wherein the program instructions further cause the processor to be configured to determine $R_B$ or $R_C$ based on $R_i=(\Sigma_{event} s_{event} \times r_i)/X$, wherein event represents a risk scenario, wherein $s_{event}$ represents a coefficient of a severity degree of an accident in the risk scenario, wherein X represents the measurement units, wherein $R_i$ represents $R_B$ when $r_i$ represents $r_b$, and wherein $R_1$ represents $R_C$ when $r_i$ represents $r_c$.

14. An apparatus for determining a driving risk of a vehicle comprising:

a memory configured to store program instructions; and a processor coupled to the memory, wherein the program instructions cause the processor to be configured to:

determine a driving mode and a risk scenario of a vehicle in a time period, wherein a start point of the time period is a first moment, wherein an end point of the time period is a second moment, and wherein the driving mode comprises at least one of a self-driving mode or a manual driving mode;

determine a first location and a movement parameter of the vehicle at the first moment when the vehicle is traveling in the manual driving mode;

predict a second location of the vehicle at a third moment based on the first location and the movement parameter, wherein the third moment is later than the first moment;

predict a shadow driving mode of the vehicle from the first location to the second location based on the first location and the second location, wherein the shadow driving mode is another self-driving mode of the vehicle that is predicted and continuously modified based on the first location and the movement parameter of the vehicle in the manual driving mode;

determine, at a current moment, a risk value in the driving mode in the time period based on a risk identification manner corresponding to the risk scenario, wherein the current moment is after the first moment and before the second moment;

determine, at the current moment, $r_a$, $r_b$, and $r_c$ based on the risk identification manner corresponding to the risk scenario, wherein $r_a$ is a first risk value in the manual driving mode in the time period, wherein $r_b$ is a second risk value in the shadow driving mode in the time period, and wherein $r_c$ is a third risk value in the self-driving mode based on a preset route in the time period, wherein $r_a$, $r_b$, and $r_c$ are determined based on $r_{SG1}=f(t)_{max}$, wherein $r_{SG1}$ is $r_a$, $r_b$, or $r_c$ in the collision scenario, wherein $t \in \{t_{event}, h(t_{event}, obj)=1\}$, wherein $f(t)=\Delta v(t)*\exp(-\min\{r_0 TTC(t), r_1 THW(t), r_2 s\})$, wherein $\{t_{event}, h(t_{event}, obj)=1\}$ represents a time period in which a collision risk occurs, wherein $TTC(t)$ represents a TTC at a t moment, wherein $THW(t)$ represents a THW at the t moment, wherein each of $r_0$, $r_1$, and $r_2$ is a normalized parameter, wherein v is a speed of the vehicle at the t moment, wherein $\Delta v(t)$ is $\Delta v$ at the t moment, wherein exp is an exponent comprising a base of a natural constant, and wherein s represents the distance between the vehicle and the collision object; and control the vehicle to travel in the driving mode after determining $r_a$, $r_b$, and $r_c$.

15. The apparatus of claim 14, wherein the program instructions cause the processor to be configured to determine, at the current moment, $r_a$, $r_b$, and $r_c$ based on an estimated time taken by the vehicle to rush out of a lane, and wherein the estimated time taken by the vehicle to rush out of the lane is negatively correlated to $r_a$, $r_b$, and $r_c$.

16. The apparatus of claim 14, wherein the program instructions cause the processor to be configured to determine, at the current moment, $r_a$, $r_b$, and $r_c$ based on a longitudinal acceleration of the vehicle, and wherein the longitudinal acceleration of the vehicle is positively correlated to $r_b$ or $r_c$.

17. The apparatus of claim 14, wherein the program instructions cause the processor to be configured to determine, at the current moment, $r_a$, $r_b$, and $r_c$ based on a lateral acceleration of the vehicle, and wherein the lateral acceleration of the vehicle is positively correlated to $r_b$ or $r_c$.

18. The apparatus of claim 14, wherein the program instructions cause the processor to be configured to determine, at the current moment, $r_a$, $r_b$, and $r_c$ based on a speed of the vehicle, and wherein the speed of the vehicle is positively correlated to $r_b$ or $r_c$.

19. The apparatus of claim 14, wherein the program instructions cause the processor to be configured to determine, at the current moment, $r_a$, $r_b$, and $r_c$ based on a speed of the vehicle and a distance from the vehicle to a traffic signal light when the risk scenario is a traffic signal light scenario, wherein the speed of the vehicle is positively correlated to $r_b$ or $r_c$, and wherein the distance from the vehicle to the traffic signal light is negatively correlated to $r_b$ or $r_c$.

20. The apparatus of claim 14, wherein the program instructions cause the processor to be configured to determine, at the current moment, $r_a$, $r_b$, and $r_c$ based on a speed ($\Delta v$) of the vehicle relative to a collision object when the risk scenario is a collision scenario, and wherein $\Delta v$ is positively correlated to $r_b$ or $r_c$.

* * * * *